United States Patent
Jacobs et al.

(10) Patent No.: US 11,809,608 B2
(45) Date of Patent: *Nov. 7, 2023

(54) METHODS AND SYSTEMS FOR USING DIGITAL SIGNATURES TO CREATE TRUSTED DIGITAL ASSET TRANSFERS

(71) Applicant: Visa International Service Association, San Francisco, CA (US)

(72) Inventors: Mondo Jacobs, San Ramon, CA (US); Ajith Thekadath, San Ramon, CA (US); Lidia Daldoss, Burlingame, CA (US); David Henstock, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,555

(22) Filed: Mar. 22, 2022

(65) Prior Publication Data

US 2022/0215132 A1    Jul. 7, 2022

Related U.S. Application Data

(63) Continuation of application No. 16/864,750, filed on May 1, 2020, now Pat. No. 11,314,900, which is a
(Continued)

(51) Int. Cl.
*G06F 21/64* (2013.01)
*H04L 9/32* (2006.01)
(Continued)

(52) U.S. Cl.
CPC ........ *G06F 21/64* (2013.01); *G06Q 20/3825* (2013.01); *H04L 9/3236* (2013.01);
(Continued)

(58) Field of Classification Search
None
See application file for complete search history.

(56) References Cited

U.S. PATENT DOCUMENTS

| 7,640,187 B1 | 12/2009 | Sonderegger et al. |
| 9,704,158 B2 | 7/2017 | Dundas et al. |

(Continued)

FOREIGN PATENT DOCUMENTS

| CN | 1636175 | 7/2005 |
| CN | 101652793 | 2/2010 |

(Continued)

OTHER PUBLICATIONS

AU2017218390, "Fourth Examination Report", dated Dec. 12, 2022, 4 pages.
(Continued)

*Primary Examiner* — Benjamin E Lanier
(74) *Attorney, Agent, or Firm* — Kilpatrick Townsend & Stockton LLP

(57) ABSTRACT

A method and system are provided for transferring digital assets in a digital asset network. Network users can be centrally enrolled and screened for compliance. Standardized transfer processes and unique identifiers can provide a transparent and direct transfer process. Digital assets can include sufficient information for ensuring that a value will be provided, including one or more digital signatures, such that value can be made immediately available to recipients.

20 Claims, 5 Drawing Sheets

Related U.S. Application Data continuation of application No. 15/283,930, filed on Oct. 3, 2016, now Pat. No. 10,693,658.

(60) Provisional application No. 62/294,825, filed on Feb. 12, 2016.

(51) Int. Cl.
  *G06Q 20/38* (2012.01)
  *H04L 9/08* (2006.01)
  *H04L 9/30* (2006.01)
  *H04W 12/10* (2021.01)
  *H04L 9/00* (2022.01)

(52) U.S. Cl.
  CPC .......... *H04L 9/3247* (2013.01); *H04L 9/3255* (2013.01); *H04L 9/085* (2013.01); *H04L 9/3066* (2013.01); *H04L 9/3297* (2013.01); *H04L 9/50* (2022.05); *H04L 2209/56* (2013.01); *H04W 12/10* (2013.01)

(56) References Cited

U.S. PATENT DOCUMENTS

| | | | |
|---|---|---|---|
| 10,523,443 B1* | 12/2019 | Kleinman | H04L 9/30 |
| 10,693,658 B2 | 6/2020 | Jacobs et al. | |
| 11,108,566 B2 | 8/2021 | Jacobs et al. | |
| 11,314,900 B2 | 4/2022 | Jacobs et al. | |
| 2002/0077985 A1 | 6/2002 | Kobata et al. | |
| 2002/0174066 A1 | 11/2002 | Kleckner et al. | |
| 2003/0158820 A1 | 8/2003 | Mathur et al. | |
| 2005/0177518 A1 | 8/2005 | Brown | |
| 2005/0182710 A1 | 8/2005 | Andersson et al. | |
| 2007/0140157 A1 | 6/2007 | Fu et al. | |
| 2010/0063897 A1 | 3/2010 | Sonderegger et al. | |
| 2013/0041770 A1 | 2/2013 | Raman et al. | |
| 2014/0064303 A1 | 3/2014 | Aweya et al. | |
| 2015/0206106 A1 | 7/2015 | Yago | |
| 2015/0206124 A1 | 7/2015 | Aubin et al. | |
| 2015/0294308 A1 | 10/2015 | Pauker et al. | |
| 2015/0332256 A1 | 11/2015 | Minor | |
| 2015/0332283 A1 | 11/2015 | Witchey | |
| 2016/0098723 A1 | 4/2016 | Feeney | |
| 2016/0191243 A1 | 6/2016 | Manning | |
| 2016/0210626 A1 | 7/2016 | Ortiz et al. | |
| 2016/0218879 A1 | 7/2016 | Ferrin | |
| 2016/0253663 A1 | 9/2016 | Clark et al. | |
| 2016/0261685 A1 | 9/2016 | Chen et al. | |
| 2016/0284033 A1* | 9/2016 | Winand | G06Q 20/145 |
| 2016/0332283 A1 | 11/2016 | Liu | |
| 2017/0048235 A1 | 2/2017 | Lohe et al. | |
| 2017/0075938 A1* | 3/2017 | Black | H04L 9/3239 |
| 2017/0180134 A1 | 6/2017 | King | |
| 2017/0228371 A1 | 8/2017 | Seger | |
| 2017/0236120 A1 | 8/2017 | Herlihy et al. | |
| 2017/0237554 A1 | 8/2017 | Jacobs et al. | |
| 2017/0323294 A1 | 11/2017 | Rohlfing et al. | |
| 2018/0204191 A1 | 7/2018 | Wilson et al. | |

FOREIGN PATENT DOCUMENTS

| | | |
|---|---|---|
| JP | 2008257598 | 10/2008 |
| KR | 20030084294 | 11/2003 |
| SG | 11201805876 | 2/2020 |
| WO | 2017139112 | 8/2017 |
| WO | 2018067232 | 4/2018 |
| WO | 2018085558 | 5/2018 |

OTHER PUBLICATIONS

Application No. CA3,011,290 , Office Action, dated Feb. 16, 2023, 3 pages.
AU2017218390 , "Third Examination Report", dated Aug. 3, 2022, 3 pages.
Application No. EP22172671.4 , Extended European Search Report, dated Aug. 3, 2022, 9 pages.
Application No. MX/A/2018/009644 , Notice of Allowance, dated Aug. 2, 2022, 3 pages.
AU2017218390 , "Second Examination Report", dated Mar. 30, 2022, 4 pages.
Application No. CN201780010861.X , Notice of Decision to Grant, dated Mar. 18, 2022, 4 pages.
Application No. EP17750566.6 , Notice of Decision to Grant, dated Apr. 14, 2022, 2 pages.
Application No. MX/A/2018/009644 , Office Action, dated Apr. 4, 2022, 9 pages.
"Linking the Chains with BTC Relay", Conseys, Available online at: https://jmedia.consensys.net/linking-the-chains-with-btc-relay-5ffd2c8248, Jun. 5, 2016, 5 pages.
"InterBlockchain Communication with Basecoin", Available online at: https://github.com/tendermint/basecoin/blob/master/docs/guide/ibc.md, Jun. 29, 2017, 11 pages.
U.S. Appl. No. 15/283,930 , Final Office Action, dated Jul. 12, 2019, 14 pages.
U.S. Appl. No. 15/283,930 , Final Office Action, dated Oct. 12, 2018, 14 pages.
U.S. Appl. No. 15/283,930 , Non-Final Office Action, dated Feb. 11, 2019, 14 pages.
U.S. Appl. No. 15/283,930 , Non-Final Office Action, dated Jun. 21, 2018, 15 pages.
U.S. Appl. No. 15/283,930 , Notice of Allowance, dated Feb. 12, 2020, 14 pages.
U.S. Appl. No. 16/693,158 , First Action Interview Office Action Summary, dated Apr. 19, 2021, 7 pages.
U.S. Appl. No. 16/693,158 , First Action Interview Pilot Program Pre-Interview Communication, dated Mar. 23, 2021, 8 pages.
U.S. Appl. No. 16/693,158 , Notice of Allowance, dated Jul. 2, 2021, 11 pages.
U.S. Appl. No. 16/864,750 , First Action Interview Office Action Summary, dated Oct. 13, 2021, 6 pages.
U.S. Appl. No. 16/864,750 , First Action Interview Pilot Program Pre-Interview Communication, dated Sep. 24, 2021, 7 pages.
U.S. Appl. No. 16/864,750 , Notice of Allowance, dated Jan. 14, 2022, 9 pages.
U.S. Appl. No. 16/864,750 , "Supplemental Notice of Allowability", dated Feb. 3, 2022, 2 pages.
AU2017218390 , "First Examination Report", dated Jan. 6, 2022, 5 pages.
Application No. CN201780010861.X , Office Action, dated Jun. 3, 2021, 16 pages.
Application No. CN201780010861.X , Office Action, dated Dec. 3, 2021, 6 pages.
Application No. EP17750566.6 , Extended European Search Report, dated Feb. 4, 2019, 10 pages.
Application No. EP17750566.6 , Office Action, dated Dec. 20, 2019, 6 pages.
Application No. EP17750566.6 , Office Action, dated Aug. 17, 2020, 7 pages.
Application No. EP17858854.7 , Extended European Search Report, dated Sep. 5, 2019, 8 pages.
IN201847033252 , "First Examination Report", dated Oct. 14, 2021, 5 pages.
Application No. MX/A/2018/009644 , Office Action, dated Nov. 3, 2021, 18 pages.
Application No. MX/A/2018/009644 , Office Action, dated Aug. 17, 2021, 4 pages.
Nakamoto , "Bitcoin: A Peer-to-Peer Electronic Cash System", Available online at: https://web.archive.orgjweb/20100704213649/http://www.bitcoin.org:80/bitcoin.pdf, Oct. 31, 2008, pp. 1-9.
Application No. PCT/US2017/015498 , International Preliminary Report on Patentability, dated Aug. 23, 2018, 10 pages.
Application No. PCT/US2017/015498 , International Search Report and Written Opinion, dated Apr. 28, 2017, 13 pages.
Application No. PCT/US2017/046364 , International Preliminary Report on Patentability, dated Apr. 18, 2019, 7 pages.
Application No. PCT/US2017/046364 , International Search Report and Written Opinion, dated Nov. 8, 2017, 10 pages.

(56) References Cited

OTHER PUBLICATIONS

Application No. SG11201805876W , Notice of Decision to Grant, dated Nov. 19, 2019, 6 pages.
SWAN , "Blockchain: Blueprint for a New Economy", O'Reilly, XP055279098, ISBN: 978-1-4919-2049-7, Feb. 8, 2015, 149 pages.

* cited by examiner

METHODS AND SYSTEMS FOR USING DIGITAL SIGNATURES TO CREATE TRUSTED DIGITAL ASSET TRANSFERS

CROSS REFERENCE TO RELATED APPLICATIONS

This application is a continuation application of U.S. application Ser. No. 16/864,750, filed May 1, 2020, which is a continuation application of Ser. No. 15/283,930, filed Oct. 3, 2016, which is a non-provisional application of and claims the benefit of the filing date of U.S. Provisional Application No. 62/294,825, filed on Feb. 12, 2016, which are herein incorporated by reference in its entirety for all purposes.

BACKGROUND

People (and organizations) often transfer value to others. Such value transfers are typically accomplished by providing value from a sender's account at a first financial institution to a recipient's account at a second financial institution. For example, a sender's account can be reduced by the value, and the recipient's account can be increased by the value.

A reduction in the sender's account value results in a gain for the first financial institution (e.g., because a liability is reduced), and an increase in the recipient's account results in a loss (e.g., because a liability is increased). In order to correct for these gains and losses at the financial institutions, the financial institutions can engage in an equal and opposite transaction. For example, the first and second financial institutions may have a correspondent bank relationship, where the first financial institution has an account at the second financial institution, and/or vice versa. The equal and opposite transaction can include debiting the first financial institution's account at the second financial institution by the same value that is credited to the recipient's account (thereby eliminating any net balance change for the second financial institution).

This type of correspondent bank relationship is typically used for international wiring of funds. However, most financial institutions only have a few correspondent bank relationships. Thus, for an international wire, it is likely that the sending financial institution does not have a direct correspondent bank relationship with the receiving financial institution. Accordingly, the first financial institution may have to indirectly transfer the value to the second financial institution. For example, the first financial institution may transfer the value to a third (intermediary) financial institution with which it has a correspondent bank relationship, and the third financial institution may then be able to transfer the value to the second financial institution. This type of indirect path is common for international transfers. For example, an international transfer may involve one or more domestic transfers in the sender's country, an international transfer, and one or more domestic transfer's in the recipient's country before finally reaching the recipient's account.

As an example, a typical international wire transfer may take place in the following manner. At step 1, Alice receives an invoice from Bob. The invoice includes a requested payment amount and information identifying Bob's English bank account. At step 2, Alice (located in the United States) instructs her American bank to send a wire fund transfer to Bob's English bank account. Alice's bank and Bob's bank do not have a direct correspondent relationship, so intermediary banks are needed. At step 3, Alice's bank sends a payment initiation message to an American correspondent bank associated with Alice's bank. For example, Alice's bank sends an MT 103 message through the Society for Worldwide Interbank Financial Telecommunication (SWIFT). The SWIFT message (e.g., an MT 103 message) instructs the American correspondent bank to pay Bob's bank a certain number of British pounds. At step 4, the American corresponding bank charges Alice's bank for the US Dollar equivalent of the amount of British pounds. For example, Alice's bank may have a correspondent account at the correspondent bank, and this account may be charged the US dollar equivalent. This charge event can be considered settlement between the correspondent bank and Alice's bank. At step 5, the American correspondent bank sends a payment instruction through SWIFT (e.g., an MT 103 message) for a payment to a next correspondent bank, this next correspondent bank residing in England. This payment instruction also requests that a payment be made to Bob's bank in order to credit Bob's account. At step 6, the English correspondent bank charges the American correspondent bank. For example, the American correspondent bank may have a correspondent account (e.g., a "nostro" account) at the English correspondent bank, and this account may be charged in British pounds. This charge event can be considered settlement between the American correspondent bank and the English correspondent bank. At step 7, the English correspondent bank sends a payment instruction through SWIFT (e.g., an MT 103 message) for a payment to Bob's bank through a local British wire system. At step 8, the Bob's bank charges the English correspondent bank. For example, the English correspondent bank may have a correspondent account at Bob's bank, and this account may be charged in British pounds. This charge event can be considered settlement between the English correspondent bank and Bob's bank. At step 9, Bob's bank credits Bob's account with the fund transfer amount (which may be reduced). At this point, Bob may be able to access the funds sent by Alice.

While this example shows the fund transfer reaching Bob, the transfer may have taken a long time (e.g., 3-7 days). Because of uncertainty in the system, each correspondent bank does not send the next payment instruction to the next bank until the funds are received during settlement. Also, each settlement step may be deferred until a net settlement process at the end of a day. Accordingly, each correspondent bank may add an extra day for the funds transfer. Time delays can be exacerbated by unsynchronized banking hours in different countries due to different time zones. Further, the funds may have been significantly reduced (by an unpredictable amount) during the transfer process, as fees may be charged for each SWIFT message, by each correspondent bank, and for foreign currency exchange. Also, in reality, there can be many more intermediary correspondent banks then described in this example.

Each of the corresponding banks may have different transfer agreements, and these agreements may not be visible to the other banks. Additionally, multiple regional wire transfer networks may be used, each potentially having different rules and protocols. Accordingly, Alice's bank may be unaware of how much time the transfer will take, the rules governing each transfer step (e.g., what information the banks may be forwarding along), the status of a pending transfer (e.g., confirmation messages may not be provided), whether the corresponding banks will correctly record the details of the transaction, and whether the transfer will even successfully reach Bob's account. Also, Alice and her bank may wish to include information with the transaction, but it may not be possible to reliably carry that data through to the receiving party. Thus, after Alice's bank sends the first funds transfer to the first correspondent bank, and Alice's bank is no longer in control, and just has to hope that the fund transfer will be completed appropriately. If a problem occurs (for example, a payment is not received or is delayed), the Alice and her bank may not be able to trace the transaction quickly or reliably.

Accordingly, international wire transfers are completed over a decentralized and non-uniform network of correspondent banking relationships. Each additional link in the chain of correspondent banks increases time, uncertainty, insecurity, cost, and inefficiency. Further, it is difficult to change the system, as the entire system can only change by renegotiating each specific correspondent bank agreement.

Embodiments of the invention address these and other problems individually and collectively.

SUMMARY

One embodiment of the invention is directed to a method. The method comprises receiving, by a first computer (e.g., an administrative node computer), from a second computer, a request to validate a digital asset including a first digital signature. The first digital signature was generated with a first private key associated with the second computer, and the digital asset indicates the transfer of a value from a sender to a recipient. The method further comprises validating the digital asset and generating a second digital signature for the digital asset. The second digital signature is generated with a second private key associated with the first computer. The method also includes providing the second digital signature to the second computer (e.g., an issuer node computer). The second computer then sends the digital asset to a recipient node computer. The method further includes recording the digital asset in a database and coordinating a transaction associated with the digital asset.

Another embodiment of the invention is directed to a first computer (e.g., an administrative node computer) configured to perform the above-described method.

Another embodiment of the invention is directed to a method comprising receiving, by a second computer (e.g., an issuer node computer), a request to transfer a value from a sender associated with a sender identifier to a recipient associated with a recipient identifier. The method also includes generating a digital asset indicating that the value is being transferred to the recipient, and generating a first digital signature for the digital asset. The first digital signature is generated with a first private key associated with the second computer. The method further comprises sending a request to validate the digital asset to a first computer (e.g., an administrative node computer). The request includes the digital asset and the first digital signature. The first computer then validates the digital asset and generates a second digital signature for the digital asset, and the second digital signature is generated with a second private key associated with the first computer. The method also includes receiving the second digital signature from the first computer, and providing the digital asset to a recipient node computer associated with the recipient. The first computer then records the digital asset in a database and coordinates a transaction associated with the digital asset.

Another embodiment of the invention is directed to a second computer (e.g., an issuer node computer) configured to perform the above-described method.

Further details regarding embodiments of the invention can be found in the Detailed Description and the Figures.

DETAILED DESCRIPTION

Figure 1:
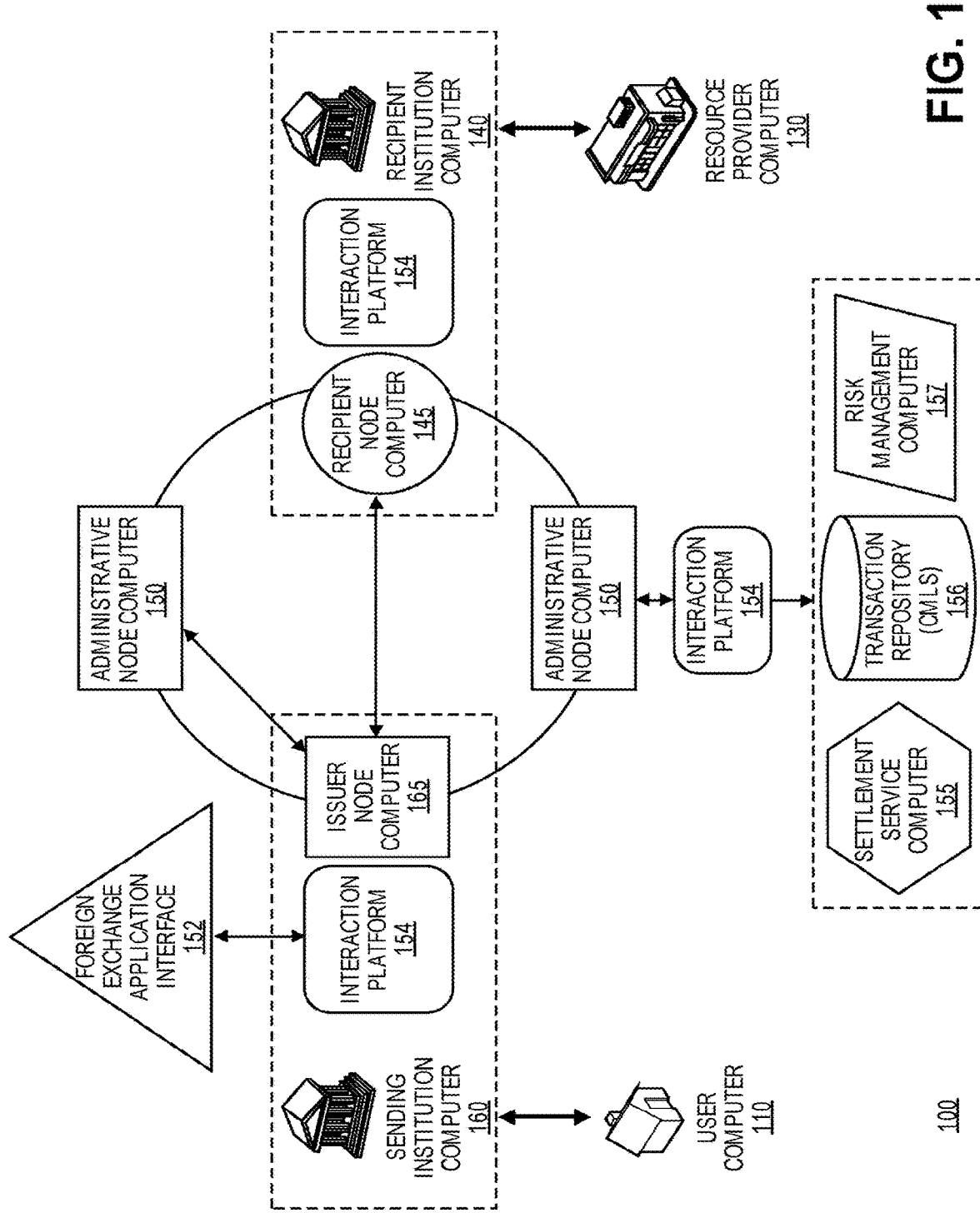
FIG. 1 shows a block diagram of a system according to an embodiment of the invention.

Embodiments of the present invention are directed to a system and method for digital asset transfers. An asset transfer network can allow digital assets to be sent quickly and directly to a recipient through a transparent process, regardless of the location and identities of the sender and receiver.

In some embodiments, the asset transfer network can be a universal network with which participating entities can be directly enrolled. A universal network can allow a sending financial institution to communicate with and provide value (e.g., a digital asset) directly to any recipient financial institution associated with the network. A digital asset can be a promise of value, and the value may be settled at a later time. A universal network can also allow for unique identification of each enrolled entity (e.g., by distributing of unique identifiers to each entity during enrollment).

In some embodiments, the asset transfer network can be a permissioned network that only allows validated entities to participate in the network. For example, a central network administrator can validate financial institutions and other entities during enrollment. During validation, the administrator can ensure that enrolling entities are legitimate organizations that are screened for compliance to network rules. The administrator can also implement standardized messaging procedures and communicate those procedures to enrolled entities.

Digital assets associated with a value transfer can, in some embodiments, be digitally signed by a sending entity and/or an administrative entity. The sender's signature can indicate that the digital asset was legitimately sent by the indicated sender, and the administrator's signature can indicate that the digital asset was approved and/or recorded by the administrator. In some embodiments, a digital signature can indicate that the digital asset has been transferred, and that the value cannot be taken back.

Embodiments allow asset transfers to be recorded in a ledger of transactions. The ledger may be a distributed ledger. For example, transferred digital asset may be announced to one or more nodes in the network, and the one or more nodes each maintain add information about new digital assets to their own ledger. Then, the different nodes can compare their ledgers in order to determine which digital assets are authentic, thereby agreeing on a common updated ledger (e.g., a new block in a blockchain).

Some embodiments include a central settlement entity. The central settlement entity may allow value to be settled efficiently from a sending account at a sending financial institution to a recipient account at a recipient financial institution. A central settlement entity may include a central financial institution with multiple locations and multiple accounts). The central settlement entity may have at least one location and one account in each country that it operates. As a result, the first financial institution can have an account (e.g., a settlement account) with the central settlement entity in a first country, and the second financial entity can have an account with the central settlement entity in a second country. Accordingly, in some embodiments, an international transfer can take place by transferring from the first financial institution to the central settlement entity, and then from the central settlement entity to the second financial institution. This means that, in some embodiments, each financial institution that participates in the asset transfer network may only have one external account with the central settlement entity (e.g., instead of multiple correspondent banking relationships).

As can be seen, embodiments provide an asset transfer network with improved speed, security, reliability, transparency, and efficiency. For example, a universal and permissioned network can be well-organized, and can enable efficient messaging and transfers directly between a sender and a recipient, regardless of location. This organization can reduce the extra communications, as well as remove the mystery of various unknown correspondent bank relationships, present in decentralized legacy systems.

Central enrollment, compliance-screening of participating entities, standardized communications, and universal identifiers that uniquely identify entities can each facilitate a sense of trust in the network and the participating entities. A distributed ledger can instill confidence that each participating entity has the same information about agreements and transfers that have been made. Similarly, digitally signed digital assets can be highly trusted, as the signatures can be validated to confirm that a digital asset is legitimately being transferred.

The high level of network trust and digitally signed digital assets can allow recipient financial institutions to make a received digital asset value immediately available in the recipient account, even if the value as not yet been settled. This means that a transferred value can be available almost immediately.

In embodiments of the invention, to initiate an asset transfer, a user (or an institution representing the user) can instruct an issuer node in the asset transfer network to generate and provide the digital asset. The issuer node can generate and digitally sign the digital asset. The issuer node can also obtain approval and a second digital signature from an administrative node (e.g., a central administrator for the network). Then, the issuer node can provide the digital asset to a recipient node (e.g., directly, or through network-wide distribution). The recipient node can then provide the digital asset to the recipient (or an institution representing the recipient).

In alternative embodiments, the digital asset can be generated and/or signed by an interaction platform (instead of the issuer node). The interaction platform can then provide the prepared digital asset to the issuer node or administrative node for distribution within the asset transfer network.

In either case, a single push-type message can be used to provide a digital asset. This single message can have enough information and be trusted enough to replace one or more traditional transfer messages (e.g., an authorization request message, an authorization response message, clearance messages, and/or multiple intermediary correspondent bank transfer messages), thereby improving messaging efficiency.

Embodiments allow for any suitable type of value to be sent in a digital asset. For example, a digital asset can represent a promise of monetary value, so the digital asset can be used to make a payment. Additionally, a digital asset can be used to provide access rights, such as an access entry code for a restricted area, tickets to an event, login credentials for accessing secured information, etc. A digital asset can also be used to transfer ownership, such as property deeds, vehicle pink slips, patent holdings, as well as to provide credit, such as game credit, energy credits, mobile phone minutes, and/or for any other suitable purpose.

Accordingly, embodiments of the invention provide an asset transfer platform that enables direct and predictable exchange of value (e.g., value represented by account data, cryptographically signed digital assets, and supporting instructions). The platform further provides compliance screening of participants (e.g., banks and their clients). In some embodiments, screening information about users is obtained from banks or other service providers. Additionally, embodiments utilize smart contracts that can automatically and forcible settle digital assets according to certain criteria (e.g., forcibly settle after digital asset has been distributed in network for 24 hours).

Prior to discussing specific embodiments of the invention, some terms may be described in detail.

A "digital asset" may refer to digital content associated with a value. In some cases, the digital asset may also indicate a transfer of the value. For example, a digital asset may include data that indicates a transfer of a currency value (e.g., fiat currency or crypto currency). In other embodiments, the digital asset may correspond to other non-currency values, such as access privileges data (e.g., a number of authorized usages or a time allotment for accessing information) and ownership data (e.g., digital right data).

In some embodiments, a digital asset may be considered a trustworthy guarantee that a value will be provided (e.g., a reliable IOU). For example, providing a digital asset to a recipient may be considered a promise that is reliable enough to replace authorization request/response messages and/or clearance messages during a transaction.

A digital asset may also include information about one or more digital asset attributes. For example, a digital asset may include information useful for transferring value from one entity or account to another. A digital asset may also include remittance information (e.g., information identifying a sending entity). In some embodiments, a digital asset may include one or more of a digital asset identifier, a value (e.g., an amount, an original currency type, a destination currency type), transfer fee information, a currency exchange rate, an invoice number, a purchase order number, a timestamp, a sending entity identifier (e.g., a sender enterprise ID), a sending entity account number, a sending entity name, sending entity contact information (e.g., an address, phone number, email address, etc.), sending institution information (e.g., a financial institution name, enterprise ID, and BIN), a recipient entity identifier (e.g., a recipient enterprise ID), a recipient entity account number, a recipient entity name, recipient entity contact information (e.g., an address, phone number, email address, etc.), and/or recipient institution information (e.g., a financial institution name, enterprise ID, and BIN). When a digital asset is received, the recipient may have sufficient information to proceed with a settlement transaction for the indicated value.

In some embodiments, a digital asset may also include digital signatures and/or encryption keys for validation and entity identification. For example, a digital asset may include an issuer node's digital signature and public key, as well as an administrative node's public key.

An "asset transfer network" may be a network for providing and/or receiving digital assets. An asset transfer network may provide infrastructure for providing digital assets in "push" messages. An asset transfer network can comprise one or more types of nodes. In some embodiments, digital assets transmitted in an asset transfer network may be recorded in a ledger of transactions. An example of an asset transfer network is a blockchain network, where a ledger of transactions can take the form of a blockchain.

The term "node" may refer to a connection point. In some embodiments, a node may be a physical electronic device that is capable of creating, receiving, or transmitting data. In other embodiments, a node may be a software module on a computing device, the software module a connection point in a communication network. In some embodiments, a node may be a computing device within an asset transfer network. A node may be able to mint an asset, transfer an asset, receive an asset, validate an asset, maintain a ledger of transactions, and/or perform any other suitable functions. Different types of nodes may be able to perform different sets of functions within an asset transfer network. In some embodiments, a node may be associated with and/or operated by a financial institution computer (e.g., a bank), a payment processor computer, a third party computer, or any other suitable entity.

The term "ledger of transactions" may refer to a compilation of data from previous transactions. The ledger of transactions may be a database or other comparable file structure that may be configured to store data from all previous digital asset transfers, including the date and time of the transfer, the transfer amount, and identification information for the participants of the transfer (e.g., the sender and the receiver of the transfer amount). In some embodiments, the ledger of transactions may be in the form of an electronic ledger (e.g., blockchain) in which data already stored in the electronic ledger is unalterable. In some embodiments, each node within an asset transfer network may store their own copy of the ledger of transactions. In other embodiments, only some nodes store their own copy of the ledger of transactions. In further embodiments, some nodes may have a restricted view of the ledger of transactions. For example, some nodes may only be able to view and/or verify transactions to which they were a party.

A ledger of transactions may include transaction records that are digitally signed (e.g., with a private key) in order to protect the transaction entries in the ledger from being doctored with false transaction data. This can prevent double spending and make all transactions immutable and irreversible, and therefore make the ledger trustworthy.

In some embodiments, a ledger of transactions can be publicly viewable. For example, one or more entities may have access to the ledger, and may be able to consult the ledger to determine whether a certain transaction actually took place, or whether a certain value is authentic. In some embodiments, the ledger may only be partially viewable to one or more entities.

As used herein, a "blockchain" may comprise a series of blocks. Each block in the blockchain may include an electronic record of one or more historical transactions, as well as metadata. In some embodiments, blocks in the blockchain can be linked by including a reference to the previous block (e.g., a hash output of a previous block). Each new block in the blockchain may be algorithmically determined based on new transactions and previous blocks in the blockchain. As a result, any tampering of data stored in these previous blocks can be detected.

An "enterprise ID" may include an identifier for a person, business, institution, or any other suitable entity. In some embodiments, an enterprise ID may be a globally unique identifier. For example, enterprise IDs may be issued by a central, trusted entity. An enterprise may include alphanumeric characters, special characters, and any other suitable symbol. In some embodiments, an enterprise ID can be a one-time-use identifier, refreshed after each transaction. In some embodiments, an enterprise ID may be used as an address for receiving a digital asset transfer (e.g., an enterprise ID may be associated with an account).

A "key pair" may include a pair of linked encryption keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to authenticate a digital signature created with the corresponding private key. The public key may be distributed throughout a network in order to allow for authentication of messages signed using the corresponding private key. Public and private keys may be in any suitable format, including those based on RSA or elliptic curve cryptography (ECC). In some embodiments, a key pair may be generated using an asymmetric key pair algorithm. However, a key pair may also be generated using other means, as one of ordinary skill in the art would understand.

The term "digital signature" may refer to an electronic signature for a message. A digital signature may be a numeric value, an alphanumeric value, or any other type of data including a graphical representation. A digital signature may be a unique value generated from a message and a private key using an encrypting algorithm. In some embodiments, a validation algorithm using a public key may be used to validate the signature.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system comprises a user computer 110 operated by a user (not shown). The user computer 110 may be in communication with a sending institution computer 160, which may be associated with an issuer node computer 165. The system 100 also comprises a resource provider computer 130 associated with a resource provider (not shown). The resource provider computer 130 may be in communication with a recipient institution computer 140, which may be associated with a recipient node computer 145. The system further comprises an interaction platform 154, one or more administrative node computers 150, a foreign exchange transaction application interface 152, a settlement service computer 155, a transaction repository 156, and a risk management computer 157. Each of the entities shown in FIG. 1 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The system 100 may allow individuals, businesses, and other entities to transfer value to one another. The system 100 can use "push" transaction messages that are digitally signed and verified by a trusted central entity. The transactions can also be recorded in a trusted ledger (e.g., a blockchain). Accordingly, the push messages can be trusted and relied on. The push messages can serve as a replacement for typical authorization request messages, authorization response messages, and/or clearing messages.

The system 100 may include a network of nodes, such as the administrative node computer 150, the issuer node computer 165, and the recipient node computer 145. These nodes may, in combination, comprise an asset transfer network (e.g., a blockchain network). Such an asset transfer network can be used for providing any suitable type of digital asset, such as a payment digital asset (e.g., for transfer of monetary value) or an access digital asset (e.g., for transfer for access privileges).

As an example, the system 100 can serve as a transaction system for providing payments. For the sake of explanation, the entire system 100 may be referred to as a transaction system, and a central network of nodes (e.g., one or more recipient node computers 145, one or more administrative node computers 150, and one or more issuer node computers 165) can be referred to as an asset transfer network.

In such a transaction system, the user can provide a payment to the resource provider. To do so, the user computer 110 may instruct the sending institution computer 160 to transfer value from a user account at the sending institution computer 160. The sending institution computer 160 can then interact with the asset transfer network and request that a digital asset is sent to the resource provider. A digital asset may be a highly-trusted promise of a value transfer. Accordingly, when the recipient institution receives an official digital asset associated with the asset transfer network, the recipient institution may be informed and guaranteed that value will be transferred from the user's account to the resource provider's account. The value can be settled between the accounts at a later time (e.g., through settlement account at a central settlement bank).

For the sake of description, the system 100 shows the examples of the user (associated with the user computer 110) and the resource provider (associated with the resource provider computer 130). Embodiments also allow value to be sent to and from any suitable entity. For example, the system 100 can host business-to-business payments, peer-to-peer payments, and any other suitable type of transfer.

In order to participate in the system 100, the user may enroll. For example, the user may (via the user computer 110 and/or an interface provided by the sending institution computer 160) enroll with the asset transfer network. Asset transfer network enrolling services may be provided by the interaction platform 154 and/or the administrative node computer 150. An asset transfer network administrator (e.g., interaction platform 154) may associate an enterprise ID with the user, the user computer 110, or the user account. In some embodiments, the sending institution computer 160 may obtain an enterprise ID from the interaction platform 154 on behalf of the user.

The sending institution computer 160 may store value on behalf of the user. The sending institution computer 160 may also be able to provide value (e.g., provide a payment) on behalf of the user. An example of a sending institution may be an issuer, which may typically refer to a business entity (e.g., a bank) that issues and maintains an account (e.g., a bank account) for a user.

A user account at the sending institution computer 160 may be associated with various user information. For example, a user transaction account may be associated with a first name, a last name, a government-issued identification number such as a driver's license number, passport number, or social security number, a date of birth, a residential and/or business address, a phone number, an account username, an account password, an email address, etc.

The sending institution computer 160 may also enroll with the asset transfer network (e.g., via the administrative node computer 150 or the interaction platform 154) in order to interact with the network. As a result, the sending institution computer 160 may also receive a unique enterprise ID.

In some embodiments, the sending institution computer 160 may also receive a key pair. Such a key pair may be stored in a hardware security module (HSM). In some embodiments, the sending institution computer 160 may maintain its own HSM. Alternatively, the sending institution computer 160 key pair may be stored in another entity's HSM (e.g., an HSM at the issuer node computer 165 or the administrative node computer 150).

The sending institution computer 160 may be associated with and/or represented by the issuer node computer 165, which may be able to provide payments (e.g., via digital assets) in the asset transfer network on behalf of the sending institution computer 160.

As explained in more detail below, embodiments provide several ways for the sending institution computer 160 to interact with the asset transfer network to request a value transfer. For example, in some embodiments, the sending institution computer 160 may work closely with the interaction platform 154, which may generate digital assets and interact with the asset transfer network on behalf of the sending institution computer 160. In such a scenario, the sending institution computer 160 may instruct the interaction platform 154 to initiate a value transfer from the user account to the resource provider account. The interaction platform 154 may then generate the digital asset, digitally sign the digital asset (e.g., with one or more digital signatures based on one or more private keys), and then provide the digital asset to the asset transfer network (e.g., the administrative node computer 150 or the issuer node computer 165). The digital asset may then be distributed within the asset transfer network and recorded.

In an alternative example, the sending institution computer 160 may instead work more closely with an issuer node computer 165 that represents the sending institution computer 160. The issuer node computer 165, instead of the interaction platform 154, may generate and sign digital assets on behalf of the sending institution computer 160. However, in some embodiments, the interaction platform 154 may still play a role by providing an interface for the sending institution computer 160 to communicate with the issuer node computer 165. In this scenario, the sending institution computer 160 may instruct with the issuer node computer 165 to initiate a value transfer from the user account to the resource provider account. The issuer node computer 165 may then generate a digital asset indicating a transfer of funds from the user to the resource provider. The issuer node computer 165 may digitally sign the digital asset, obtain a second digital signature from the administrative node computer 150, and provide the digital asset to the recipient node computer 145. The recipient node computer 145 may provide the digital asset to the recipient institution computer 140.

In other embodiments, the sending institution computer 160 may directly manage and control the issuer node computer 165, or may have white-label access to the asset transfer network. In any case, there may be a way for the sending institution computer 160 to access the network and initiate transactions.

The interaction platform 154 may include one or more server computers. As mentioned above, the interaction platform 154 may facilitate interaction between the asset transfer network and the financial institutions (e.g., the sending institution computer 160 and the recipient institution computer 140). For example, the interaction platform 154 may include a platform and interface (e.g., an application interface) that allows the financial institutions and users to access the asset transfer network (e.g., communicate with nodes in the network)

Embodiments allow the interaction platform 154 to take a more active role by performing tasks such as enrolling users, generating digital assets, signing digital assets, maintain transaction records, etc. Other embodiments allow the interaction platform 154 to take a more passive role by performing less tasks, and instead acting primarily as a communication interface between the asset transfer network and the financial institutions.

The interaction platform 154 may allow users (via the user computer 110) and financial institutions to enroll for participating with the asset transfer network and set up a profile. The interaction platform 154 may also provide an interface where users and financial institutions can initiate a transaction, as well as view foreign exchange rates and transfer fees, and receive reconciliation information for a transaction.

The interaction platform 154 may also maintain a record of transactions that have taken place (e.g., a list of transactions or a blockchain-type ledger). Further, the interaction platform 154 may perform analytics of user and bank behavior. Users and financial institutions may be allowed to view analytics, view a global directory, and view network compliance information.

As described above, the interaction platform 154 may also perform a number of services related to generating assets, digitally signing assets, storing transactions records, and any other suitable service. However, these services will instead be described further below with respect to the administrative node computer 165. This is because, in some embodiments, some or all of the functionality described below with respect to the administrative node computer 150 may instead be performed by the interaction platform 154. Similarly, some or all of the functionality with respect to the interaction platform 154 may instead be performed by the administrative node computer 150. Additionally, the interaction platform 154 and the administrative node computer 150 may be combined as a single entity. In some embodiments, the administrative node computer 150 may be a node that is associated with the interaction platform 154 and that participates in the asset transfer network on behalf of the interaction platform 154 (e.g., similar to how the issuer node computer 165 is associated with the sending institution computer 160).

Embodiments allow the interaction platform 154 and the administrative node computer 150 to exchange functionality and/or be combined because, in some embodiments, both of these entities may be associated with and/or operated by the same managing entity. This managing entity (not shown in the system 100) may be a central entity that administrates the system 100. Accordingly, the interaction platform 154 and the administrative node computer 150 may work together as different components of one network-organizing entity. This managing entity may be associated with and/or operate several other entities in the system 100, such as the interaction platform 154, the foreign exchange transaction application interface 152, the settlement service computer 155, the transaction repository 156, and/or the risk management computer 157.

In some embodiments, the managing entity may also operate the asset transfer network. For example, the managing entity may provide the issuer node computer 165, the administrative node computer 150, and/or the recipient node computer 145. However, in other embodiments, a third party entity may provide the asset transfer network (e.g., the managing entity may outsource control of the asset transfer network). Even in this scenario, the managing entity may still operate one or more nodes (e.g., the administrative node computer 150), or the managing entity may communicate with an administrative node computer 150 that represents the managing entity within the asset transfer network.

In some embodiments, the managing entity may be a transaction processing entity (e.g., one or more transaction processing computers). As an example, a transaction processing computer may include data processing subsystems, networks, and operations used to support and deliver authorization services, exception file services, and clearing and settlement services. For example, the transaction processing computer may comprise a server coupled to a network interface (e.g., by an external communication interface), and databases of information. A transaction processing computer may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. A transaction processing computer may use any suitable wired or wireless network, including the Internet.

The administrative node computer 150 may administrate the asset transfer network. While one administrative node computer 150 is shown in the system 100, there may any suitable number of administrative nodes. In addition to acting as a node in the asset transfer network, the administrative node computer 150 may also organize and ensure the reliability of the asset transfer network. The administrative node computer 150 may be a trusted central entity. As a result, the asset transfer network administered by the administrative node computer 150 may also be trusted. For example, as explained in more detail below, the asset transfer network can be a federated network.

The administrative node computer 150 may provide a number of services to facilitate the asset transfer network and the transaction system. For example, the administrative node computer 150 may enroll nodes, service providers, users, etc. The administrative node computer 150 may also provide enterprise identifiers and key pairs to these enrolled entities. The administrative node computer 150 may also generate digital assets, validate new digital assets, provide digital signatures for new digital assets, and maintain a ledger of transactions.

Figure 2:
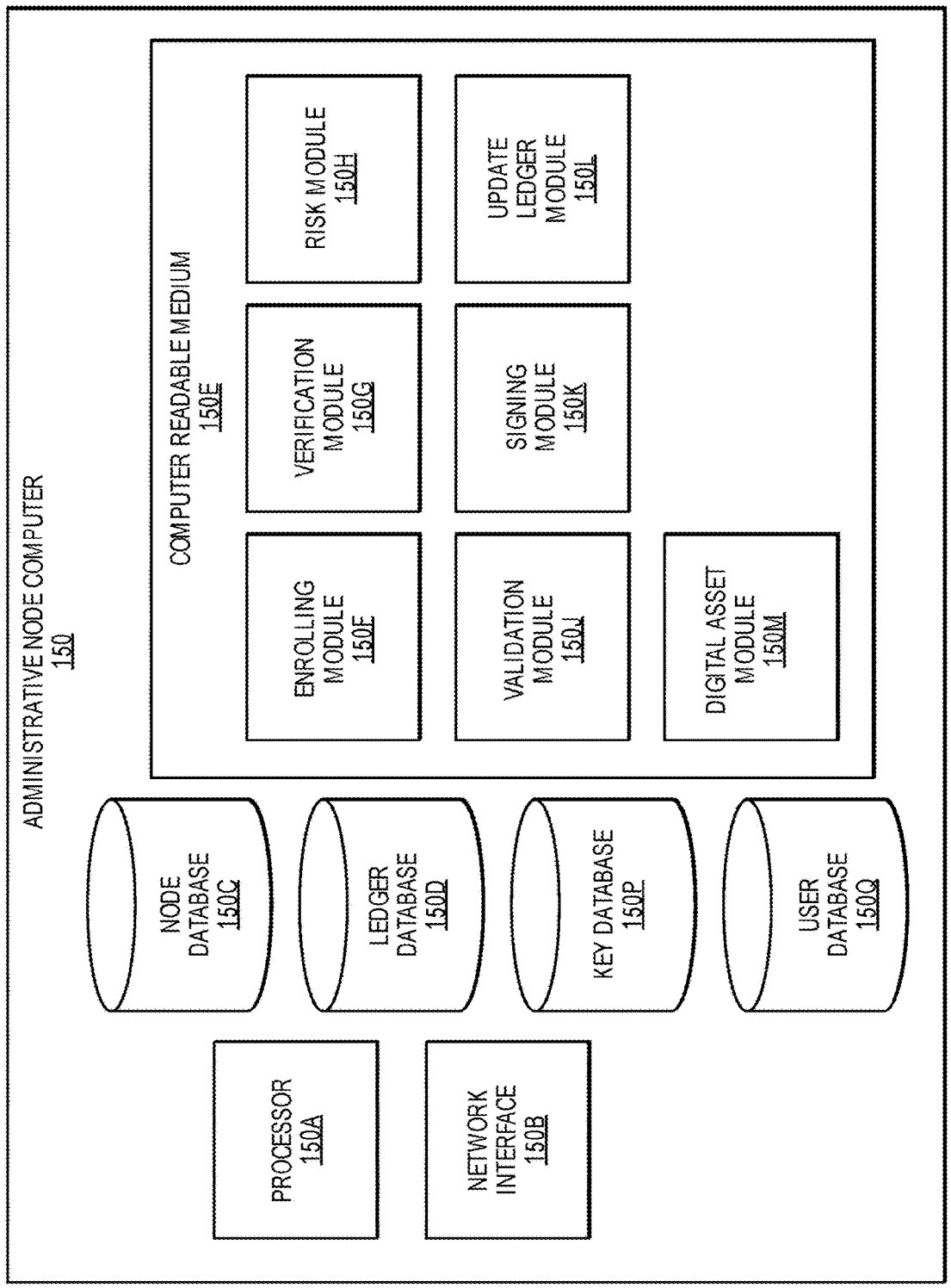
FIG. 2 shows a block diagram of an administrative node computer according to an embodiment of the invention.

An example of an administrative node computer 150, according to some embodiments of the invention, is shown in FIG. 2. The administrative node computer 150 comprises a processor 150A, a network interface 150B, a node database 150C, a ledger database 150D, a key database 150P, a user database 150Q, and a computer readable medium 150E.

The computer readable medium 150E may comprise an enrolling module 150F, a verification module 150G, a risk module 150H, a validation module 150J, a signing module 150K, an update ledger module 150L, a digital asset module 150M, and any other suitable software module. The computer readable medium 150E may also comprise code, executable by the processor 150A for implementing a method comprising receiving, from an issuer node computer, a request to validate a digital asset including a first digital signature, wherein the first digital signature was generated with a first private key associated with the issuer node computer, and wherein the digital asset indicates the transfer of a value from a sender to a recipient; validating the digital asset; generating a second digital signature for the digital asset, the second digital signature generated with a second private key associated with the administrative node computer; providing the second digital signature to the issuer node computer, wherein the issuer node computer sends the digital asset to a recipient node computer; recording the digital asset in a database; and coordinating a transaction associated with the digital asset.

As mentioned above, one or more functions, modules, databases, or other aspects of the administrative node computer 150 may instead be embodied at the interaction platform 154.

The enrolling module 150F may comprise code that causes the processor 150A to enroll entities (e.g., financial institutions, users, and businesses) for interacting with the asset transfer network. For example, the enrolling module 150F may contain logic that causes the processor 150A to receive a request from an entity to join the system. The logic may include instructions for evaluating whether or not an entity can enroll, as well as what level of risk to assign to a new entity. For example, the administrative node computer 150 may determine a risk profile for an enrolling financial institution, based on, for example, whether it is a known bank (e.g., based on financial institution name or bank identification number), the risk level of the bank's country, and whether the bank has provided collateral. The administrative node computer 150 may assign a risk level, as well as activity limits based on the risk profile. Activity limits for various types of entities can include, for example, maximum transaction threshold limits and/or velocity limits, such as a limit on the number of digital assets or total digital asset value that can be generated within a certain time period (e.g., a day, a week, or a month).

The enrolling module 150F may include instructions for assigning permissions to enrolled entities. For example, the administrative node computer 150 may allow different nodes, service providers, and users to have different views of a global transaction ledger. In some embodiments, the administrative node computer 150 may allow financial institutions to view transactions to which they were a party.

When users and businesses enroll for participation with the asset transfer network, their information (e.g., a name, an address, a phone number, a business' corporate profile, etc.) may be disclosed to the administrative node computer 150, such that the administrative node computer 150 has sufficient information about participating entities. Further, in some embodiments, the administrative node computer 150 may have access to user information collected by a service provider (e.g., a bank), such as a user's legal name, address (street, city, country, etc.), date of birth, and any other suitable information.

The enrolling module 150F may also include instructions for generating and assigning an enterprise ID for an enrolled entity. Additionally, there may be instructions for generating and distributing keys to enrolled entities. For example, the administrative node computer 150 may generate a key pair for a bank or user when enrolled. In some embodiments, the administrative node computer 150 may provide a digital certificate to an enrolled entity, the digital certificate proving that the entity is certified by the administrative node computer 150, and the digital certificate linking the entity with a public key. In some embodiments, a public key may be used as an enterprise ID.

Information about enrolled users, businesses, and other participants may be maintained in the user database 150Q. In some embodiments, a separate node database 150C may include information about other nodes (e.g., issuer nodes and recipient nodes), as well as entities associated with those nodes.

The verification module 150G may comprise code that causes the processor 150A to verify a digital signature. For example, the verification module 150G may contain logic that causes the processor 150A to apply a public key to a digital signature in order to verify that the signature is authentic. For example, if a signed digital asset is allegedly generated by the issuer node computer 165, a public key associated with the issuer node computer 165 can be used to verify the signature.

The risk module 150H may comprise code that causes the processor 150A to evaluate transaction risk and/or entity risk. For example, the risk module 150H may contain logic that causes the processor 150A to determine the risk for a certain digital asset based on the transaction velocity of one or more parties involved.

The risk module 150H may also include instructions for placing restrictions on entities that are showing risky behavior, or entities involved in settlement failure. For example, if a financial institution is exceeding spending limits, the administrative node computer 150 may temporarily block digital assets generated by the financial institution.

The validation module 150J may comprise code that causes the processor 150A to validate a transaction. For example, the validation module 150J may contain logic that causes the processor 150A to analyze information in a digital asset and determine whether or not to approve the digital asset. For example, the instructions may include determining whether the named recipient (and/or sender) of a digital asset is an enrolled customer that has been screened for compliance. The instructions may also include verifying that financial institutions (or other service providers) are complying with rules and protocols. For example, financial institutions may be required to have know-your-customer compliance (e.g., sufficient information about users), office of foreign assets control compliance, anti-money laundering compliance, etc. Additionally, in some embodiments, a final transaction amount and currency may be confirmed based on the sending amount and currency, the foreign exchange rate, and the transfer fees.

The signing module 150K may comprise code that causes the processor 150A to generate digital signatures. For example, the signing module 150K may contain logic that causes the processor 150A to generate a digital signature for a digital asset using an administrative node private key. The administrative node computer's digital signature can serve to indicate the authenticity of a digital asset, and can provide a guarantee that a transfer is valid and trustworthy. In some embodiments, the administrative node computer's digital signature can be considered a cosigning of the digital asset, or a minting of the digital asset. Further, the digital signature can activate a smart contract that holds the sending institution computer 160 liable for the sending amount in the originating currency. For example, a smart contract can automatically initiate a settlement process after a certain amount of time.

In some embodiments, the administrative node computer 150 may include or be associated with a hardware security module (shown in FIG. 2 as the key database 150P). The hardware security module (HSM) may store one or more keys (e.g., a private key) for the administrative node computer 150, and the hardware security module may sign messages and/or digital assets on behalf of the issuer node computer 165.

The update ledger module 150L may comprise code that causes the processor 150A to maintain a ledger of transactions. For example, the update ledger module 150L may contain logic that causes the processor 150A to record information about a digital asset along with records of previous digital assets. For example, the administrative node computer 150 may record a digital asset once it is minted (e.g., approved and digitally signed), and/or once it is sent to the recipient node computer 145. The ledger may be certified as authentic by the administrative node computer 150, and authenticity can be shown by a digital signature (e.g., for each transaction, or for the entire ledger).

In some embodiments, the update ledger module 150L may include instructions for maintaining a ledger of transactions in the form of a blockchain. For example, the administrative node computer 150 may be able to create and/or sign new blocks. A new block including one or more digital assets may be generated after an average time interval (e.g., every minute, ten minutes, 1 hour, etc.). Authenticity may be provided to a block via a digital signature. The administrative node computer 150 may optionally create a hash header for each block based on the digital assets in the block, a hash of a previous block, a nonce, a random number, and/or any other suitable information.

A ledger, such as a blockchain ledger, may be stored in a ledger database 150D. Additional databases may store transaction records (e.g., a list of transactions not in a blockchain) and/or invoice records. Further, a settlement database may include information about transactions to be settled. In some embodiments, one or more of these databases may instead be embodied by the transaction repository 156.

In embodiments of the invention, the blockchain ledger may not be present on all computers in a distributed network, but may be maintained by a secure administrative node computer 150. Accordingly, computationally intensive features such as proofs of work may not be present or needed. In some embodiments, there may be multiple administrative node computers 150 that each receive transaction updates and update their own ledger. These different administrative node computers 150 may communicate with one another to confirm that their ledgers have the same transaction information.

The update ledger module 150L may further include instructions for providing transaction updates to other nodes. For example, when a new digital asset is validated and signed, the administrative node computer 150 may distribute information about the new digital asset to other nodes (other administrative nodes, issuer nodes, and/or recipient nodes) in the network, such that other nodes can update their own ledgers. The administrative node computer 150 may additionally or alternatively distribute information about ledger updates (e.g., new transaction blocks).

In some embodiments, issuer nodes and recipient nodes may not maintain their own ledger, and may instead refer to the centrally-maintained ledger of the administrative node computer 150. For example, the issuer node computer 165 and the recipient node computer 145 may each be light nodes. In such a case, the administrative node computer 150 may provide other nodes with real-time access to a central ledger, or the administrative node computer 150 may provide regular ledger updates (e.g., updates can be sent every 10 seconds, 1 minute, 5 minutes, etc.). As a result, other nodes may be aware of new digital assets immediately or soon after the digital assets are minted.

The ledger of transactions may provide the administrative node 150 with real-time visibility into the net-position of each financial institution, user, and/or business at any point in time. However, in some embodiments, other entities may not be able to see the entire ledger, and they may instead have a filtered or permissioned view of the ledger. For example, other nodes, financial institutions, and/or users may only be able to view transactions to which they were a party.

This selective disclosure of sensitive information in the global ledger can be accomplished through one or more techniques. For example, the administrative node computer 150 may not provide other nodes (e.g., the issuer node computer 165 and/or the recipient node computer 145) with access to the full ledger. Instead, the administrative node computer 150 may only allow each node to view transactions in the ledger with which they are associated. For example, the administrative node computer 150 may send a reduced copy of the ledger to each node, or may block parts of the ledger when a central ledger is being accessed by a node.

In some embodiments, one-time-use addresses (e.g., one-time-use enterprise IDs, or other one-time-use identifiers) can be used for payees and/or payors. As a result, the user and/or resource provider may not be personally identifiable based on an address or other information in a digital asset. Thus, even if a transaction (and the transaction details) is publicly viewable, the user may not be identified based on information in the transaction. Instead, the user's identity and account number can remain anonymous. However, the user and resource can maintain information about one-time-use addresses and identifiers which they have used, and thereby be able to identify transactions in the ledger to which they were party.

In some embodiments, a filtered ledger view can also be achieved through encrypting metadata in digital assets. For example, information identifying the user and/or resource provider in a digital asset can be encrypted with public keys associated with the user and/or resource provider. As a result, only the user and/or resource provider may be able view decrypt and view identification (or other) information in digital assets included in a ledger to which they were party.

In some embodiments, zero-knowledge proofs can be used to establish the filtered ledger view. Zero-knowledge proofs can cryptographically conceal the digital asset value and/or identification information in a transaction, while allowing the entire network to validate the integrity of the contents. For example, an outside party can use a zero-knowledge proof to verify that a digital asset's claimed value is authentic (and not fraudulent), but the outside party may not be able to identify the exact history of the value or the parties involved. As a result, only the parties involved (and those granted access) can view the details of the transaction. Embodiments may not require normal proof of work, as the ledger may be trusted without such verification (e.g., due to the federated nature of the network).

The update ledger module 150L may further include instructions for communicating information about new digital assets to end users (e.g., the user computer 110 and/or the resource provider computer 130). For example, the administrative node computer 150 may send a message to the user computer and/or the resource provider computer 130 when a digital asset is created, signed, and/or distributed. As a result, the end users can be aware of new transfers when they initially take place. In some embodiments, messages can instead be sent to service providers (e.g., the sending institution computer 160 and/or the recipient institution computer 140), which may in turn inform the end users.

As mentioned above, in some embodiments, the administrative node computer 150 (or the interaction platform 154) may perform one or more functions instead of the issuer node computer 165. For example, instead of the issuer node computer 165, the administrative node computer 150 may generate digital assets on behalf of the sending institution computer 160. For this reason, the administrative node computer 150 may include a digital asset module 150M. The digital asset module 150M may comprise code that causes the processor 150A to create digital assets. For example, the digital asset module 150M may contain logic that causes the processor 150A to generate a digital asset including information associated with transferring a value from a user account to a recipient account.

Additionally, in some embodiments, the administrative node computer 150 may generate a digital signature on behalf of the sending institution computer 160 and/or issuer node computer 165. For example, the administrative node computer 150 may store keys associated with the sending institution computer 160 and/or issuer node computer 165, and may create a digital signature for a digital asset after the digital asset is generated.

Referring back to FIG. 1, the issuer node computer 165 may be a node in the asset transfer network, and the issuer node computer 165 may be associated with the sending institution computer 160. The issuer node computer 165 may be able to generate, mint (or request minting), and/or provide digital assets in order to transfer value (e.g., funds) on behalf of the sending institution computer 160. In some embodiments, the issuer node computer 165 may receive a payment instruction from the sending institution computer 160 via the interaction platform 154.

In some embodiments, the issuer node computer 165 may exclusively provide services for one financial institution. In other embodiments, the issuer node computer 165 may represent two or more financial institutions (e.g., multiple banks).

In some embodiments, the issuer node computer 165 may be centrally-enrolled (e.g., by the administrative node computer 150 or a third party enrolling service provider) in order to participate in the asset transfer network. Once enrolled, the issuer node computer 165 may be associated with an enterprise ID.

Figure 3:
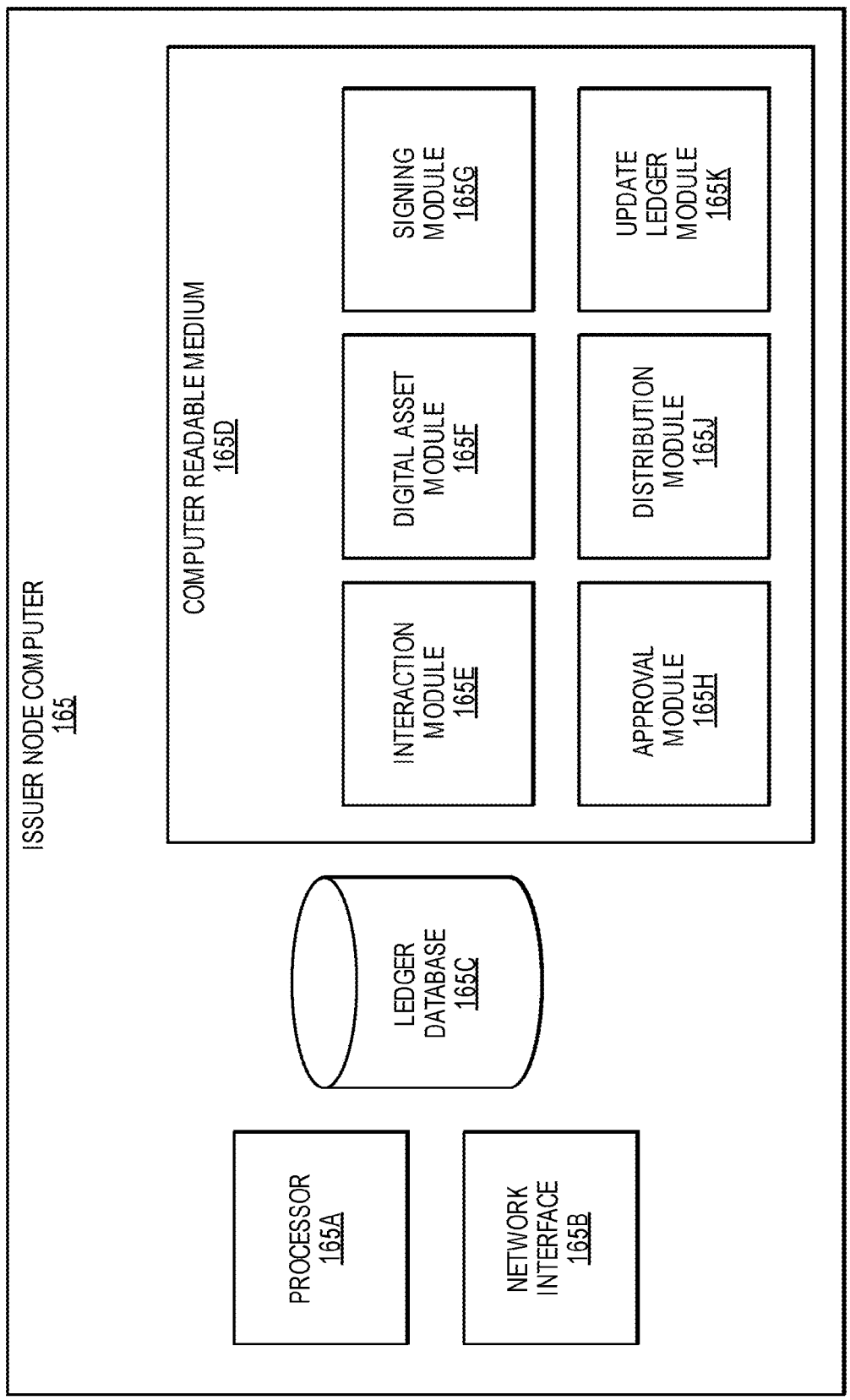
FIG. 3 shows a block diagram of an issuer node computer according to an embodiment of the invention.

An example of an issuer node computer 165, according to some embodiments of the invention, is shown in FIG. 3. The issuer node computer 165 comprises a processor 165A, a network interface 165B, a ledger database 165C, and a computer readable medium 165D.

The computer readable medium 165D may comprise an interaction module 165E, a digital asset module 165F, a signing module 165G, an approval module 165H, a distribution module 165J, an update ledger module 165K, and any other suitable software module. The computer readable medium 165F may also comprise code, executable by the processor 165A for implementing a method comprising receiving a request to transfer a value from a sender associated with a sender identifier to a recipient associated with a recipient identifier; generating a digital asset indicating that the value is being transferred to the recipient; generating a first digital signature for the digital asset, the first digital signature generated with a first private key associated with the issuer node computer; sending, to an administrative node computer, a request to validate the digital asset, the request including the digital asset and the first digital signature, wherein the administrative node computer validates the digital asset and generates a second digital signature for the digital asset, the second digital signature generated with a second private key associated with the administrative node computer; receiving the second digital signature from the administrative node computer; and providing the digital asset to a recipient node computer associated with the recipient, wherein the administrative node computer records the digital asset in a database and coordinates a transaction associated with the digital asset.

The interaction module 165E may comprise code that causes the processor 165A to interact with other entities, such as the sending institution computer 160 and the interaction platform 154. For example, the interaction module 165E may contain logic that causes the processor 165A to receive a payment instruction from the sending institution computer 160 (e.g., via the interaction platform 154).

The digital asset module 165F may comprise code that causes the processor 165A to create digital assets. For example, the digital asset module 165F may contain logic that causes the processor 165A to generate a digital asset including information for transferring a value from a user account to a recipient account.

The signing module 165G may comprise code that causes the processor 165A to create a digital signature. For example, the signing module 165G may contain logic that causes the processor 165A to apply a private key and/or a mathematical algorithm to a digital asset, such that the digital signature is generated for the digital asset. Other entities (e.g., other nodes) may then be able to use a corresponding public key to verify the digital signature, and thereby verify the authenticity of the digital asset.

In some embodiments, the issuer node computer 165 may include or be associated with a hardware security module. The hardware security module (HSM) may store one or more keys (e.g., a private key) for the issuer node computer 165, and the hardware security module may sign messages and/or digital assets on behalf of the issuer node computer 165.

In some embodiments, the issuer node computer's key pair may be generated and provided by the administrative node computer 150 (e.g., via a digital certificate), or by a separate third party service computer. In other embodiments, the issuer node computer's key pair may be generated locally (e.g., by a hardware security module). When a key pair is generated locally, the issuer node computer 165 may provide the key pair to the administrative node computer 150 during enrolling.

The approval module 165H may comprise code that causes the processor 165A to obtain approval for a digital asset. For example, the approval module 165H may contain logic that causes the processor 165A to provide a digital asset and/or a corresponding issuer node digital signature to the administrative node computer 150 in order obtain approval and a second digital signature from the administrative node computer 150. The administrative node computer 150 may then verify the issuer node computer's digital signature, validate the digital asset, and generate a second digital signature for the digital asset.

The distribution module 165J may comprise code that causes the processor 165A to distribute digital assets. For example, the distribution module 165J may contain logic that causes the processor 165A to provide a digital asset to a recipient node computer 145, an administrative node computer 150, and/or any other suitable node or other entity. In order to provide a digital asset to the appropriate recipient node computer 145, the issuer node computer 165 may operate suitable routing tables. For example, the recipient node computer 145 may be identified based on an enterprise identifier, public key, bank identification number, and/or any other suitable identifier in the digital asset.

The update ledger module 165K may comprise code that causes the processor 165A to record information related to the creation and/or distribution of a digital asset for a transaction. For example, the update ledger module 165K may contain logic that causes the processor 165A to record information by updating a ledger of transactions based on a new digital asset or other transaction. Such a ledger may be stored at the ledger database 165C. The update ledger module 165K may include instructions for adding a block to a blockchain, the new block including information about one or more transactions.

In some embodiments, the issuer node computer 165 may view a ledger kept by the administrative node computer 150 or by a third-party ledger manager, instead of maintaining its own ledger.

In some embodiments, the issuer node computer 165 may only be able to view a subset of transactions that take place within the asset transfer network. For example, the issuer node computer 165 may have a filtered view of a full ledger (e.g., a blockchain) maintained by the administrative node computer 150. The issuer node computer 165 may be able to view transaction records for transactions to which the issuer node computer 165 or the sending institution computer 160 was party.

This filtered ledger view may be achieved through several possible implementations. In one example, the issuer node computer 165 may be a light node, only receiving information about relevant transactions. In another example, the issuer node computer 165 may obscure the ledger, such that the recipient institution computer's view of the ledger is filtered. In a further example, digital assets may include less information about the providing entities (e.g., the user, sending bank, and/or sending node), such that recipients can receive the value from the digital asset without personal sender information being exposed. Techniques for providing the filtered ledger view are described above.

In some embodiments, one or more of the above-described issuer node computer 165 functions may instead be performed by another entity, such as the administrative node computer 150 or interaction platform 154. For example, instead of the issuer node computer 165, the interaction platform 154 may generate a digital asset on behalf of the sending institution computer 160 (e.g., the interaction platform 154 may do this instead of forwarding a transaction instruction to the issuer node computer 165). Similarly, in some embodiments, another entity may manage keys and provide digital signatures on behalf of the issuer node computer 165. For example, the administrative node computer 150 or interaction platform 154 can store the issuer node computer's keys in an HSM, and can generate digital signatures for digital assets on behalf of the issuer node computer 165.

Referring back to FIG. 1, the recipient node computer 145 may be a node in the asset transfer network. The recipient node computer 145 may be associated with or operated by the recipient institution computer 140. For example, the recipient node computer 145 may be able to receive digital assets on behalf of the recipient institution computer 140, may store digital assets on behalf of the recipient institution computer 140, and may transfer the received digital assets to the recipient institution computer 140 (e.g., via the interaction platform 154).

In some embodiments, the recipient node computer 145 may exclusively provide services for one financial institution. In other embodiments, the recipient node computer 145 may represent two or more financial institutions (e.g., multiple banks).

The recipient node computer 145 may be centrally-enrolled (e.g., by the administrative node computer 150) in order to participate in the asset transfer network. Once enrolled, the recipient node computer 145 may be associated with an enterprise ID.

The recipient node computer 145 may be able to receive a digital asset sent by the issuer node computer 165 and/or the administrative node computer 150. In some embodiments, digital assets may be broadcasted to several or all nodes, and the recipient node computer 145 may identify which digital assets are relevant to the recipient institution and/or resource provider (e.g., based on a recipient enterprise ID indicated in the digital asset).

The recipient node computer 145 may also validate that a digital asset is authentic. For example, the recipient node computer 145 may verify one or more digital signatures associated with a digital asset. The digital signatures may be verified with public keys associated with the signing entities (e.g., the sending institution computer 160, the issuer node computer 165, and/or the administrative node computer 150).

In some embodiments, the recipient node computer 145 may also record information about digital assets received for a transaction. For example, the recipient node computer 145 may update a ledger of transactions based on a new digital asset or other transaction. In some embodiments, the recipient node computer 145 may add a block to a blockchain, the new block including information about one or more digital assets. In other embodiments, the recipient node computer 145 may view a ledger kept by the administrative node computer 150, instead of maintaining its own ledger.

In some embodiments, the recipient node computer 145 may only be able to view a subset of transactions that take place within the asset transfer network. For example, the recipient node computer 145 may have a filtered view of a full ledger (e.g., a blockchain) maintained by the administrative node computer 150. The recipient node computer 145 may be able to view transaction records for transactions to which the recipient node computer 145 or the recipient institution computer 140 was party. For example, the recipient node computer 145 may be a light node, only receiving information about relevant transactions. In some embodiments, the recipient node computer 145 may obscure the ledger, such that the recipient institution computer's view of the ledger is filtered.

The issuer node computer 165 and recipient node computer 145 may provide different services (e.g., providing and receiving digital assets) for a financial institution that utilizes the asset transfer network. Accordingly, each financial institution (e.g., the sending institution computer 160 and the recipient institution computer 140) may use the services of both an issuer node computer 165 and a recipient node computer 145. In some embodiments, a single node may act as both an issuer node and a recipient node.

The recipient institution computer 140 may store value and receive value (e.g., receive a payment) on behalf of the resource provider computer 130. An example of a recipient institution may be an acquirer, which may typically be a business entity (e.g., a commercial bank) that has a business relationship with a particular resource provider or other entity. Some entities can perform both issuer and acquirer functions. Some embodiments may encompass such single entity issuer-acquirers.

In some embodiments, the recipient institution computer 140 may make a value indicated in a received digital asset immediately usable (e.g., withdrawable) in a resource provider account. The recipient institution computer 140 may settle the transaction by receiving the actual value (instead of just an IOU) at a later time.

The recipient institution computer 140 may enroll for interaction with the asset transfer network (e.g., via the interaction platform 154 or the administrative node computer 150) in order to participate in the system 100. As a result, the recipient institution computer 140 may receive and be associated with a unique enterprise ID. In some embodiments, the recipient institution computer 140 may also receive and be associated with a key pair. Such a key pair may be stored in an HSM.

The resource provider computer 130 may be associated with a resource provider, which may be an entity that can provide a resource such as goods, services, information, and/or access. Examples of a resource provider include merchants, access devices, secure data access points, etc. A merchant may typically be an entity that engages in transactions and can sell goods or services, or provide access to goods or services.

The resource provider may have an account at the recipient institution computer 140. The account may be associated with various resource provider information. For example, a resource provider account may be associated with a merchant name, a residential and/or business address, a phone number, an account username, an account password, an email address, etc.

The resource provider computer 130 may be enrolled for asset transfer network services. For example, the resource provider may enroll via the interaction platform 154, or the recipient institution computer 140 may enroll on behalf of the resource provider. Accordingly, the resource provider computer 130 may also be associated with a unique enterprise ID.

The foreign exchange transaction application interface 152 may provide information about foreign exchange rates. For example, before initiating an international transaction, the user computer 110 and/or sending institution computer 160 may be able to view real-time foreign exchange rates for the transaction. In some embodiments, the foreign exchange transaction application interface 152 may be provided by the interaction platform 154, the administrative node computer 150, or otherwise by a managing entity (e.g., a payment processing entity).

The settlement service computer 155 (which may include one or more server computers) may be able to provide settlement services. For example, a digital asset may act as a guarantee of payment or an IOU (e.g., a certificate of intended payment), but the actual transfer of funds may not actually take place when a digital asset is provided. Accordingly, after the digital asset is sent, the settlement service computer 155 may be able to facilitate the actual exchange of funds between the sending institution computer 160 and the recipient institution computer 140 (e.g., by transferring value between respective settlement accounts at a central settlement bank). The settlement service computer 155 may facilitate settlement by interacting with a central settlement account service (e.g., a central bank) that may be associated with the asset transfer network. For example, a central bank may be associated with the administrative node computer 150, the interaction platform 154, or a managing entity. In some embodiments, the settlement service computer 155 itself may be operated by the interaction platform 154 or otherwise by a managing entity (e.g., a payment processing entity).

The transaction repository 156 (which may include one or more server computers) may be a database for past transactions. For example, a ledger of transactions may be stored at the transaction repository 156. The administrative node computer 150 may store its ledger (e.g., a blockchain ledger) or a non-blockchain record of transactions at the transaction repository 156.

The risk management computer 157 (which may include one or more server computers) may provide risk management services. For example, the risk management computer 157 may analyze the risk associated with digital assets being sent in the asset transfer network. In some embodiments, the functions described with respect to the risk module 150H at the administrative node computer 150 may instead be performed by the risk management computer 157.

In some embodiments, the system 100 may include one or more asset auditor nodes (not shown), which may be able to audit the network. For example, an asset auditor node may confirm that different ledgers match, that nodes and financial institutions are acting within the rules and limits, and that no double spending is taking place. Asset auditor nodes may be operated by the same managing entity as the interaction platform 154 and/or the administrative node computer 150.

As mentioned above, the system 100 can be used for any type of value transfer, such as the transfer of access credentials, digital media, or any other suitable value. Accordingly, service providers that are not financial institutions may also be able to participate in the system 100. For example, other service providers may be able to manage user accounts, operate issuer nodes and recipient nodes, etc.

Figure 4:
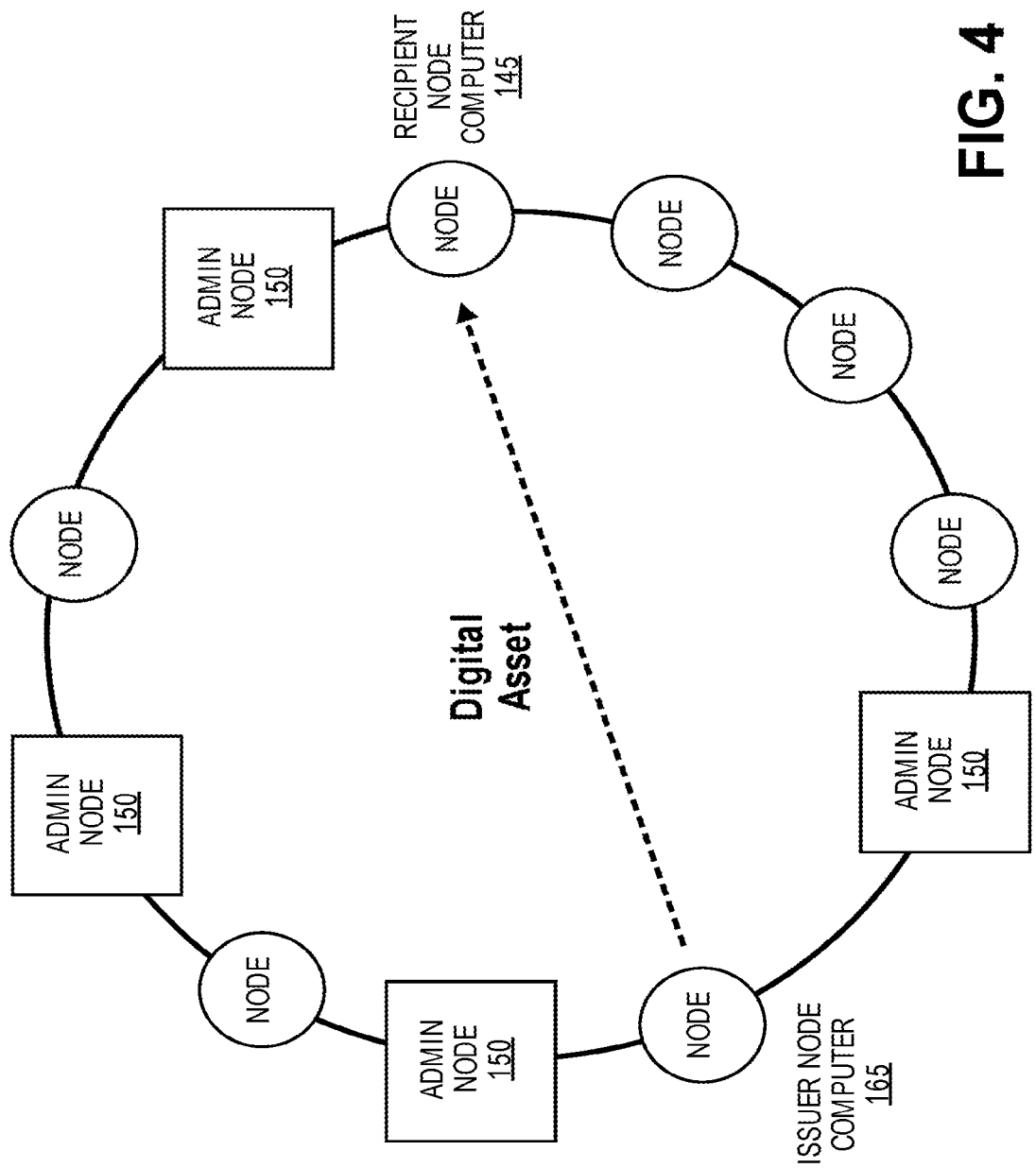
FIG. 4 shows an example of an asset transfer network, according to an embodiment of the invention.

An example of an asset transfer network is shown in FIG. 4. In some embodiments, as shown in FIG. 4, several nodes may be able to provide and receive digital assets within the asset transfer network. An example transfer is shown, where an issuer node computer 165 is providing a digital asset to a recipient node computer 145. While a direct arrow is shown, the issuer node computer 165 may actually broadcast the digital asset information to several or all of the nodes in the network. One or more administrative nodes may maintain a ledger of digital assets that have been transferred between nodes.

In some embodiments, the asset transfer network may be a blockchain network. For example, the ledger can take the form of a blockchain. Each block in the blockchain may include information about one or more transactions (e.g., digital assets. A blockchain ledger may be unalterable without detection. For example, each block may include a data header that includes a hash of the previous block in the blockchain ledger and a root value of all past transactions. Since each block in the blockchain ledger may be generated in a similar manner by including a data header storing information referencing its previous entry and previous transactions, no entry can be modified without affecting all following entries. This ensures that any tampering of information related to transactions, such as an attempt to reassign a digital asset to an inappropriate entity, will not go unnoticed.

In some embodiments, the asset transfer network may be a federated asset transfer network (also known as a "permissioned" asset transfer network). For example, permission may be required from a trusted central party in order to participate in the asset transfer network. As explained above, the administrative node computer 150 may be able to enroll entities into the network. Accordingly, the administrative node computer 150 may be able to decide which parties can participate, as well as set rules and protocols for participating in the network. The administrative node computer 150 may also be able to restrict an entity if desired (e.g., limit or block a financial institution due to misbehavior).

Entities that can validate the network (e.g., enroll entities for participating, and enforce compliance) may be referred to as "federated" entities. In some embodiments, the administrative node computer 150 may be the only federated entity. In other embodiments, another entity may perform this administrating role instead of the administrative node computer 150. For example, a managing entity (which may be associated with the administrative node computer 150), or a separate third party service provider, may administrate asset transfer network.

In some embodiments, the asset transfer network may function as a private asset transfer network. For example, the asset transfer network may serve as a tool for a transaction processor to record transactions. The network ledger may essentially be an outsourced record-keeping system, and may only be accessed and/or modified by the transaction processor.

Figure 5:
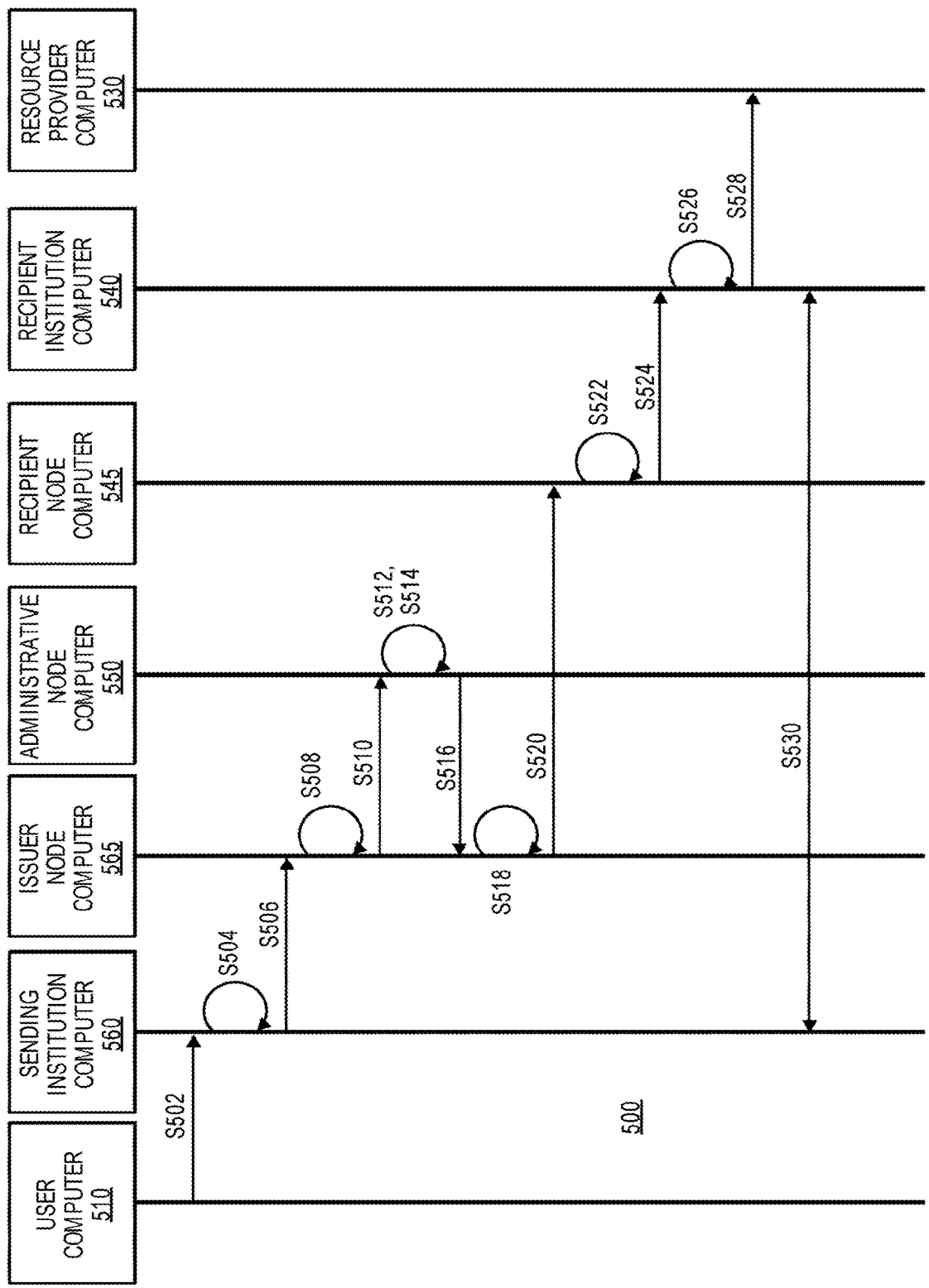
FIG. 5 shows a flow diagram illustrating a method for providing a digital asset in an asset transfer network, according to embodiments of the invention.

A method 500 according to embodiments of the invention can be described with respect to FIG. 5. Some elements in other Figures are also referred to. The steps shown in the method 500 may be performed sequentially or in any suitable order in embodiments of the invention. In some embodiments, one or more of the steps may be optional.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

As described above, a number of entities may be enrolled for interaction with an asset transfer network (which may be a blockchain network). Each entity (e.g., nodes, financial institutions, and users) may be associated with and identifiable based on a unique enterprise ID. In the following example, the network is used for transferring currency. However, transfer of any other suitable type of value (e.g., usage credit, access credentials, ownership credentials, digital media, etc.) can also take place.

The user computer 510 may initiate providing a value to the resource provider computer 530. For example, the resource provider may provide goods or services to the user, and the resource provider computer 530 may send a payment invoice to the user computer 510. The invoice may include an amount, a currency type, an enterprise ID associated with the resource provider computer 530 or a resource provider account, information about goods or services provided, an invoice identifier, and any other suitable information.

At step S502, the user (e.g., via the user computer 510) may contact the sending institution computer 560 and request that a payment is sent to the resource provider computer 530. The user computer 510 may provide any suitable information about the payment, such as an amount and a recipient currency type, information identifying the recipient (e.g., the resource provider's enterprise ID), an invoice, and a selection of a user account from which to draw funds for the payment.

The payment may be an international transfer. For illustrative purposes only, the user account may be an account based in the United States including US Dollars. The recipient (e.g., resource provider) account may be an account based in England including British Pounds.

At step S504, the sending institution computer 560 may gather information for initiating the payment. For example, for an international transaction, a foreign exchange rate may be needed in order to identify the correct amount of currency to withdraw from the user's account. The sending institution computer 560 may obtain information about a current foreign exchange rate that is relevant for the transaction (e.g., exchange rate for US Dollars to British Pounds) from the foreign exchange transaction application interface (e.g., via the interaction platform).

The foreign exchange transaction application interface or interaction platform may also provide information about transfer fees that may be charged for the transaction. For example, there may be fees charged by the sending institution computer 560, the recipient institution computer 540, and/or any of the participating nodes for administrating the transaction. In some embodiments, all of these fees may be immediately calculated and available before the transaction is initiated. The sending institution computer 560 may also provide this fee and foreign exchange information to the user computer 510.

Accordingly, the sending institution computer 560 may be able to determine the amount of funds that will be drawn from the user's account (i.e., how much to charge the user). The total charge can be calculated based on the amount the resource provider should receive, the transfer fees, and the exchange rate.

For example, the user may wish to provide £1000 to the resource provider. The foreign exchange rate may be 1 British Pound to 1.33 US Dollars. Accordingly, $1330 may be needed to provide £1000. Additionally, the sending institution computer 560 may charge $15 for the transfer. Accordingly, it may be determined that the user will be charged $1345 in order to provide £1000.

In other embodiments, the sending institution computer 560 may instead start with the user's indicated amount to send in the originating currency, and may deduct the fees and exchange rate in order to determine the amount that the resource provider will receive.

The sending institution computer 560 may also check that the transaction will conform to rules and limits placed on the user and/or sending institution computer 560, as well as perform any suitable risk analysis. For example, the sending institution computer 560 may verify that the transaction will not exceed velocity or amount thresholds for the user account or the sending institution computer 560. The sending institution computer 560 can also verify that the user's account has sufficient funds for the transaction.

At step S506, the sending institution computer 560 may send a transaction request to the issuer node computer 565 (e.g., via the interaction platform). The request may include information for providing a payment to the resource provider, such as information about the originating currency, the destination currency, the amount, the fees and exchange rate, a resource provider enterprise ID, a user enterprise ID, and sending institution computer 560 enterprise ID, and any other suitable information.

The sending institution computer 560 may also debit or place a hold on the user's account for the total charge amount. Thus, the funds may still be available for settlement at a later time.

At step S508, the issuer node computer 565 may generate a digital asset for the requested transaction. The digital asset may include any suitable information (e.g., remittance information) for communicating that a value is being transferred from the user account to a resource provider account. For example, the digital asset can include a digital asset identifier, the originating currency type, the destination currency type, the sending currency amount, the fees and exchange rate, the destination currency amount, various user information (e.g., user enterprise ID, address, phone number, email address), various sending institution computer 560 information (e.g., financial institution name, enterprise ID, public key, BIN), various resource provider computer 530 information (e.g., enterprise ID, name, address, phone number, email address), various recipient institution computer 540 information (e.g., financial institution name, enterprise ID, public key, BIN), an issuer node computer 565 enterprise ID and/or public key, a recipient node computer 545 enterprise ID and/or public key, an invoice number and invoice information, a purchase order number, a timestamp, and any other suitable information. The digital asset identifier may be an identifier generated by issuer node computer 565 that uniquely identifies the digital asset. For example, the digital asset identifier may be a string of alphanumeric characters or a scannable image (e.g., QR code). A transaction identifier may be used as a digital asset identifier.

The issuer node computer 565 may also generate a digital signature for the digital asset, the digital signature demonstrating that the digital asset was truly created by the issuer node computer 565. The digital signature may be generated by applying a mathematical algorithm to the digital asset and the issuer node computer's private key (or the sending institution computer's private key). The digital signature may be attached to or included in the digital asset, as may the issuer node computer's corresponding public key for verifying the digital signature.

The digital asset may be considered a guarantee for the payment amount. Thus, once it is signed and sent, various entities can count the payment as either completed or soon to be completed. For example, the digital asset may be valued similarly to a paper check, and may include any necessary information for obtaining the promised funds.

Before generating and/or providing the digital asset, the issuer node computer 565 may also check that the digital asset transaction conforms to rules, protocols, and limits (e.g., velocity and transaction amount thresholds).

At step S510, the issuer node computer 565 may provide the digital asset and any other suitable information to an administrative node computer 550. The issuer node computer 565 may request approval of the digital asset, as well as request a second digital signature.

At step S512, the administrative node computer 550 may validate the digital asset. For example, the administrative node computer 550 may identify each involved entity based on the enterprise IDs, and may ensure that each entity is enrolled and in good standing. For example, the administrative node computer 550 may check whether each entity is following rules and protocols, and within any risk limits. The administrative node computer 550 may also perform risk analysis on the transaction, checking for any warning flags (e.g., an unusually high amount, or an unusual direction of transfer for a given account or financial institution).

The administrative node computer 550 may also verify the issuer node computer's digital signature (e.g., with the issuer node computer's public key or the sending institution computer's public key). The administrative node computer 550 may also check that the attached public key is truly associated with the issuer node computer's enterprise ID, and similarly make sure that other information in the digital asset is accurate and valid.

At step S514, after validating the transaction, administrative node computer 550 may generate a second digital signature for the digital asset. For example, the administrative node computer 550 may use a private key to generate a digital signature based on information in the digital asset. In some embodiments, the digital asset may be considered minted and valid after the second digital signature is provided. The administrative node computer 550 may also attach a smart contract to the digital asset.

At step S516, the administrative node computer 550 may provide the digital asset and second digital signature back to the issuer node computer 565. The issuer node computer 565 may thus be informed that the digital asset is validated and ready for use.

At this point, or at a later time, the administrative node computer 550 may also update a ledger of transactions based on the digital asset. An entry in the ledger may include information about the value, the recipient of the value, the sender of the value, the transaction date and time, the digital asset identifier, and any other suitable information. In some embodiments, the ledger may store include a copy of the digital asset.

In some embodiments, the administrative node computer 550 may also distribute information about the digital asset or updated ledger to other administrative node computers 550. Also, when the ledger is updated, the transaction (e.g., transfer of value from the user to the resource provider) may be considered official and guaranteed.

In some embodiments, the administrative node computer 550 may update a ledger by adding a new block to a blockchain, the new block including information about the new digital asset. The new block may also include information about other transactions that took place during a similar time period (e.g., all digital assets minted within a ten minute interval).

In some embodiments, the ledger may not be updated (e.g., a block may not be added) until the transactions are validated throughout the asset transfer network. The nodes in the network may use Simplified Byzantine Fault Tolerance (SBFT), or any other suitable method, to reach consensus on how blocks are added to the blockchain at each step. In SBFT, one designated block generator (e.g., an administrative node computer 550) collects and validates proposed transactions, periodically batching them together into a new-block proposal. Other designated block signers (e.g., administrative node computers 550) ratify the proposed block with their signatures. All network members may know the identities of the block signers and accept blocks only if signed by a sufficient number of signers. This ensures that competing transactions can be resolved, transactions can be final, and history cannot be rewritten.

At step S518, having received the second digital signature for the digital asset, the issuer node computer 565 may update a ledger of transactions to include the new digital asset. Alternatively, in some embodiments, the issuer node computer 565 may not maintain its own ledger, and may instead refer to the administrative node computer's ledger when needed.

At step S520, the digital asset may be generated, minted (e.g., signed), recorded, and ready to send. Accordingly, in some embodiments, the issuer node computer 565 may provide the digital asset to the recipient node computer 545. The issuer node computer 565 may identify the correct recipient node computer 545 for providing the digital asset based on one or more enterprise IDs present in the digital asset (e.g., an enterprise ID of the recipient node computer 545, the recipient institution computer 540, or the resource provider computer 530). Embodiments allow several alternative methods of providing the digital asset to the recipient node computer 545, which are described below after this flow description.

At step S522, the recipient node computer 545 may receive and verify the authenticity of the digital asset. For example, the recipient node computer 545 may verify that one or more digital signatures are authentic and associated with the sending institution computer 560, the issuer node computer 565 and/or the administrative node computer 550.

In some embodiments, the digital asset may include public keys associated with the sending institution computer 560, the issuer node computer 565 and/or the administrative node computer 550. Alternatively, the digital asset may include enterprise IDs associated with one or more of these entities, and the recipient node computer 545 may lookup appropriate public keys based on the enterprise IDs. The recipient node computer 545 may then use the public keys included to verify the one or more digital signatures.

In some embodiments, verifying the digital signatures can be considered verification that the digital asset information is valid, and that the digital asset value is legitimately being transferred. In some embodiments, the recipient node computer 545 may also confirm that the value being transferred is properly owned by the user (e.g., if the recipient node computer 545 has a full ledger view or other access to user account records).

In some embodiments, the recipient node computer 545 may also update a ledger. Alternatively, in some embodiments, the recipient node computer 545 may not maintain its own ledger, and may instead refer to the administrative node computer's ledger when needed.

At step S524, the recipient node computer 545 may forward the digital asset to the recipient institution computer 540 (e.g., via the interaction platform). The recipient node computer 545 may provide all digital assets to the same recipient institution computer 540, or may provide the digital asset to a recipient institution computer 540 associated with an enterprise ID indicated in the digital asset. Additionally, the recipient node computer 545 may provide a message to the resource provider computer 530 with information about the received digital asset and promised value.

At step S526, the recipient institution computer 540 may store the digital asset and associate it with the resource provider's account. The recipient institution computer 540 may identify the resource provider computer 530 and/or the resource provider account based on a recipient enterprise ID indicated in the digital asset.

In some embodiments, the recipient institution computer 540 may have a high level of trust that the digital asset authentic and that the value will be provided. For example, the recipient institution computer 540 may trust the digital signatures provided with the digital asset, the recipient institution computer 540 may trust the administrative node computer 550, and the recipient institution computer 540 may trust other participating network entities because they all have been screened when enrolled. It may be unlikely that a fraudster submitted the digital asset instead of the issuer node computer 565, as the issuer node computer's private key may be kept secure. Also, even if the transfer was fraudulently initiated, the administrative node computer 550 may still guarantee the funds.

Accordingly, in some embodiments, the recipient institution computer 540 may immediately credit the resource provider's account with a value indicated in the digital asset. As a result, the value may be available for use (e.g., withdrawal) immediately upon receipt of the digital asset, even if the value has only been promised, and not actually received.

The value credited to the resource provider account may be less than the amount indicated in the digital asset. For example, the recipient institution computer 540 and/or other entities may charge fees that may be deducted from the provided amount.

For example, the resource provider may receive a digital asset for £1000 from the user. However, the receiving institution computer 540 may charge £20 for the transfer. Accordingly, the resource provider account may only be credited with £980.

At step S528, the recipient institution computer 540 may inform the resource provider computer 530 that a digital asset has been received, and that a certain value has been credited to the resource provider's account. The recipient institution computer 540 may provide remittance data including the payment amount, information about the sender (e.g., the user and/or sending institution computer 560), and any other suitable information to the resource provider computer 630.

At this point, the user computer 510 and/or sending institution computer 560 may also be informed that the transfer was completed. For example, the interaction platform may provide a recon file to the user computer 510 and/or sending institution computer 560.

At step S530, at a later time, settlement for the digital asset value can take place between the sending institution computer 560 and the recipient institution computer 540. For example, the settlement service computer may coordinate the transfer of value. Information relevant to settlement (e.g., enterprise IDs, amount, etc.) can be obtained from the digital asset.

In some embodiments, settlement can include debiting the digital asset value from the user's account at the sending institution computer 560. The digital asset can also be transferred to a central bank (e.g., a financial institution provided by an entity that manages the asset transfer network or any other suitable entity). Alternatively, the sending institution computer 560 may have an account pre-loaded with funds at the central bank, so the digital asset value does not need to be transferred from the sending institution computer 560 to the central bank at this point (e.g., because funds are already at the central bank).

Settlement can continue by debiting the digital asset value (or a recued settlement value) from a first account (e.g., a first settlement account) associated with the sending institution computer 560 at the central bank, and the value can be credited to a second account (e.g., a second settlement account) associated with the recipient institution computer 540 at the central bank. For example, the sending institution computer 560 and the recipient institution computer 540 may have created settlement accounts with this central bank when enrolling for participation in the asset transfer network, and these accounts may exist specifically for settlement procedures. The first account may be in a first central bank location, which is in a first country (e.g., the United States), while the second account may be in a second central bank location, which is in a second country (e.g., England). Accordingly, the second account may be credited with British Pounds (thereby effecting a currency exchange).

Once the value arrives at the second account associated with the recipient institution computer 540, the recipient institution computer 540 may then credit the resource provider account at the recipient institution with the digital asset value. Alternatively, as described above, the recipient institution computer 540 may have already credited the resource provider account at step S526.

As a result, settlement may not need to travel through multiple correspondent banking relationships. Instead, the funds can be settled between the recipient institution computer 540 and the sending institution computer 560 through the central bank. Further, the recipient institution computer 540 and the sending institution computer 560 may each only maintain one account with the central bank (or other settlement account service provider). The recipient institution computer 540 and the sending institution computer 560 may not have to manage any other correspondent banking relationships, as all transfers may be accomplished through the asset transfer network and central bank. As a result, the recipient institution computer 540 and the sending institution computer 560 may not have to set aside resources for multiple correspondent accounts or otherwise interface with multiple correspondent banks.

In other embodiments, the digital asset value can be settled through one or more correspondent bank relationships (e.g., instead of through a central bank). For example, settlement can take place through one or more correspondent banks in a first country (e.g., the United States), an international correspondent bank relationship, and one or more correspondent banks in a second country (e.g., England).

In some embodiments, the digital asset may be a smart contract that is designed to settle within a pre-defined period of time (e.g., 5 hours, 1 day, or 1 week). Alternatively, a smart contract may cause the settlement process to execute along with the next batch of settlements, or at a certain time of day. After settlement, the digital asset can be destroyed (e.g., deleted or marked as settled). Also, the digital asset can be digitally signed to indicate that settlement was completed, and the transaction record can be stored (e.g., in a database list or a blockchain ledger).

In some embodiments, a number of digital asset transfers can be settled at the same time. Accordingly, a net position can be calculated between the sending institution computer 560 and the recipient institution computer 540. Instead of transferring back and forth the value of each digital asset, a one net total can be transferred to whichever entity is net owed (e.g., based on a certain settlement period including a certain set of digital asset transfers).

As mentioned above with respect to step S520, the digital asset may be provided to the recipient node computer 545 in a number of alternative manners. For example, in some embodiments, instead of providing a single targeted message to the recipient node computer 545, the issuer node computer 565 may distribute the digital asset to several or all nodes throughout the asset transfer network (e.g., all the recipient nodes in the network). In this scenario, the recipient node computer 545 may be one of several nodes that receive the digital asset. The recipient node computer 545 may recognize that the digital asset is intended for the recipient institution computer 540 based on an enterprise ID included in the digital asset.

Alternatively, in some embodiments, the administrative node computer 550 may distribute the digital asset on behalf of the issuer node computer 565. The administrative node computer 550 may provide the digital asset directly to the recipient node computer 545, or may distribute the digital asset to a plurality of recipient nodes (as described above). In other embodiments, the administrative node computer 550 may instead publicly distribute updates about the transaction ledger to one or more nodes. In this scenario, the recipient node computer 545 may review the new digital assets recorded in the updated ledger, and identify any relevant digital assets (e.g., based on enterprise IDs).

In other embodiments, neither the issuer node computer 565 nor the administrative node computer 550 may distribute the digital asset. Instead, the administrative node computer 550 may continually update a ledger of transactions, and the recipient node computer 545 may have access (e.g., real-time access) to the ledger. In this scenario, the recipient node computer 545 may regularly or continually check a central ledger (e.g., hosted by the administrative node computer 550) for relevant transactions.

Additionally, as mentioned above, one or more additional nodes (e.g., administrative nodes, issuer nodes, and/or recipient nodes) may also maintain their own ledger and extend it based on the digital asset transfer. However, in some embodiments, certain entities and nodes may only be able to view a subset of transactions (or meaningful information associated with a subset of transactions), instead of the entire ledger. Accordingly, in some embodiments, the ledger may not be entirely public, as access may be restricted and filtered based on the viewing entity.

As mentioned with regard to FIG. 1, the sending institution computer 560 may interact with the asset transfer network in a number of ways. Accordingly, in some embodiments, steps S506-S520 may take place in an alternative manner. For example, instead of contacting the issuer node computer 565 directly, the sending institution computer 560 may communicate about the digital asset with the interaction platform.

In such a scenario, the sending institution computer 560 may send the transaction request to the interaction platform. The interaction platform may then generate the digital asset (instead of the issuer node computer 565), or the interaction platform may request that the digital asset be generated (e.g., by a node in the asset transfer network). Further, the interaction platform (instead of the issuer node computer 565) may generate a digital signature for the digital asset based on the private key of the issuer node computer 565 or the sending institution computer 560. The interaction platform may also play some roles of the administrative node computer 550, such as providing a second digital signature.

Then, the interaction platform may provide the digital asset and corresponding digital signatures to the asset transfer network, thereby publishing the transaction. For example, the interaction platform may provide the digital asset and signatures to the issuer node computer 565 and/or the administrative node computer 550. Once the digital asset arrives in the asset transfer network, the digital asset may be distributed among the nodes and provided to the recipient node computer 545.

Embodiments of the invention have a number of advantages. For example, embodiments provide an asset transfer network with improved speed, security, reliability, transparency, and efficiency. A universal and permissioned network can be well-organized, and can enable efficient messaging across known pathways that facilitates direct value transfers between a sender and a recipient, regardless of location. This organization can reduce the extra communications, as well as remove the mystery of various unknown correspondent bank relationships, present in decentralized legacy systems.

Central enrollment, compliance-screening of participating entities, standardized communications, and universal identifiers that uniquely identify entities can each facilitate a sense of trust in the network and the participating entities. This trust can be further increased knowing that the network validators (e.g., the administrative nodes) can be limited, known, defined in advance, and operated by a trusted party. A distributed ledger can instill confidence that each participating entity has the same information about agreements and transfers that have been made. Similarly, digitally signed digital assets can be highly trusted, as the signatures can be validated to confirm that the sending financial institution has performed proper transaction validation and that a digital asset is legitimately being transferred.

The high level of network trust and digitally signed digital assets can sufficiently reduce transaction risk to allow recipient financial institutions to make a received digital asset value immediately available in the recipient account, even if the value as not yet been settled. This means that a transferred value can be available almost immediately after the transfer is initiated. Thus, regardless of how and when settlement takes place, embodiments allow funds to be available much faster than traditional transfer methods (e.g., immediately vs. 3-7 days).

The use of a central settlement service entity (e.g., a central bank) advantageously allows a centralized settlement process. For example, in some embodiments, a sending bank and a receiving bank may each have an account at a central bank. When the sending bank wishes to transfer a value to a receiving bank, the value can be transferred between their respective accounts at the central bank. The accounts can be at a single central bank location in one country, or the central bank can have multiple locations in different countries (e.g., a global bank). Either way, the central bank can coordinate the value transfer from the sending bank account to the receiving bank account. This provides a more streamlined and transparent process than traditional correspondent banking relationships used for international wire transfers. Instead of transferring across multiple correspondent banks (e.g., three, four, five, or more transfer steps across different banks), funds can be settled at the central bank. In addition to simplifying the settlement process, this also advantageously allows each bank to access a global asset transfer network with only one external relationship (e.g., a relationship with the central bank). As a result, a given bank may no longer need to maintain multiple correspondent bank relationships, which can traditionally include twenty or more relationships.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
receiving, by a first computer, from a second computer, a digital asset and a first digital signature for the digital asset, the digital asset including a sender identifier of a sender, a recipient identifier of a recipient, and an amount to pay the recipient by the sender, wherein the first digital signature was generated by the second computer based on the digital asset and a first private key associated with the second computer;
validating, by the first computer, the digital asset;

verifying, by the first computer, the first digital signature;

generating, by the first computer, a second digital signature for the digital asset, the second digital signature generated based on the digital asset and a second private key associated with the first computer;

generating, by the first computer, a block for a blockchain associated with the first computer, the block including information about the digital asset; and after generating the block, coordinating, by the first computer, a transfer of funds including the amount from the sender to the recipient in a settlement process.

2. The method of claim 1, wherein validating the digital asset includes analyzing the sender identifier of the sender, the amount, and the recipient identifier of the recipient.

3. The method of claim 1, wherein generating the second digital signature for the digital asset includes signing at least some information of the digital asset with the second private key, and wherein the second computer generated the first digital signature by signing at least some information of the digital asset with the first private key.

4. The method of claim 1, wherein the first digital signature was generated by the second computer in response to the first computer receiving a transaction request from a sending institution computer holding an account of the sender.

5. The method of claim 1, wherein verifying the first digital signature is performed using a first public key associated with the second computer, the first public key corresponding to the first private key.

6. The method of claim 5, wherein the first public key is stored at the first computer, and further comprising:
before verifying, looking up the first public key using the sender identifier.

7. The method of claim 5, wherein the digital asset further includes the first public key, and further comprising:
before verifying, obtaining the first public key from the digital asset.

8. The method of claim 1, further comprising:
providing, by the first computer, the digital asset to a recipient node computer, where the recipient node computer provides the digital asset to a recipient institution computer holding an account of the recipient.

9. The method of claim 1, further comprising:
providing, by the first computer, the second digital signature to a recipient node computer, where the recipient node computer verifies the second digital signature using a second public key associated with the first computer, the second public key corresponding to the second private key.

10. The method of claim 1, wherein a recipient node computer receives the digital asset and the second digital signature, verifies that the second digital signature is authentic, and transmits the digital asset to a recipient institution computer associated with the recipient.

11. The method of claim 10, wherein the recipient institution computer immediately credits an account of the recipient with the amount indicated in the digital asset even if the amount has not actually been received from the sender.

12. The method of claim 1, wherein the settlement process includes a settlement between a recipient institution computer holding a second account of the recipient and a sending institution computer holding a first account of the sender.

13. The method of claim 1, wherein an interaction platform comprises the first computer.

14. A first computer comprising:
a processor; and
a computer readable medium, the computer readable medium comprising code, executable by the processor, for implementing a method comprising:
receiving, from a second computer, a digital asset and a first digital signature for the digital asset, the digital asset including a sender identifier of a sender, a recipient identifier of a recipient, and an amount to pay the recipient by the sender, wherein the first digital signature was generated by the second computer based on the digital asset and a first private key associated with the second computer;
validating the digital asset;
verifying the first digital signature;
generating a second digital signature for the digital asset, the second digital signature generated based on the digital asset and a second private key associated with the first computer;
generating a block for a blockchain associated with the first computer, the block including information about the digital asset; and
after generating the block, coordinating a transfer of funds including the amount from the sender to the recipient in a settlement process.

15. The first computer of claim 14, wherein the blockchain is not updated until all transactions in the block have been validated by nodes in an asset transfer network, wherein the transactions in the block are validated using a Simplified Byzantine Fault tolerance process.

16. A method comprising:
receiving, by a second computer, a request to transfer an amount from a sender to a recipient;
generating, by the second computer, a digital asset including a sender identifier of the sender, a recipient identifier of the recipient, and the amount to pay the recipient by the sender,
generating, by the second computer, a first digital signature for the digital asset, the first digital signature generated based on the digital asset and a first private key associated with the second computer; and
sending, by the second computer, to a first computer, the digital asset and the first digital signature for the digital asset, wherein the first computer validates the digital asset, verifies the first digital signature, generates a second digital signature based on the digital asset and a second private key associated with the first computer, generates a block including information about the digital asset for a blockchain associated with the first computer, and coordinates a transfer of funds including the amount from the sender to the recipient in a settlement process.

17. The method of claim 16, wherein the request is received from a sending institution computer holding an account of the sender, the request includes the sender identifier of the sender and the recipient identifier of the recipient, and wherein a recipient node computer receives the digital asset and the second digital signature, verifies that the second digital signature is authentic, and transmits the digital asset to a recipient institution computer associated with the recipient.

18. The method of claim 16, wherein generating the first digital signature for the digital asset includes signing at least some information of the digital asset with the first private key, and wherein the first computer generates the second digital signature by signing at least some information of the digital asset with the second private key, and wherein the first computer verifies the first digital signature using a first public key associated with the second computer, the first public key corresponding to the first private key.

19. The method of claim 16, wherein an interaction platform comprises the first computer.

20. The method of claim 16, further comprising:
receiving, by the second computer, the first private key and a corresponding first public key from the first computer during an enrolling process.

\* \* \* \* \*